(12) United States Patent
Lang

(10) Patent No.: US 6,167,829 B1
(45) Date of Patent: *Jan. 2, 2001

(54) LOW-DRAG, HIGH-SPEED SHIP

(76) Inventor: Thomas G. Lang, 417 Loma Larga Dr., Solana Beach, CA (US) 92075

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/948,242

(22) Filed: Oct. 9, 1997

(51) Int. Cl.$^7$ ............................................. B63B 1/24
(52) U.S. Cl. ..................... 114/278; 114/61.12; 114/272
(58) Field of Search ........................... 114/67 A, 61, 114/272, 273, 278, 280, 274, 61.12, 61.13, 61.14; 244/207, 208, 214

(56) References Cited

U.S. PATENT DOCUMENTS

| | | |
|---|---|---|
| 1,656,411 | 1/1928 | Baldwin . |
| 2,906,228 * | 9/1959 | Wendel ................. 114/280 |
| 3,016,865 | 1/1962 | Eichenberger . |
| 3,041,992 | 7/1962 | Lee . |
| 3,044,432 | 7/1962 | Wennagel et al. . |
| 3,065,723 | 11/1962 | Tulin . |
| 3,075,489 | 1/1963 | Eichenberger . |
| 3,109,495 | 11/1963 | Lang . |
| 3,199,484 * | 8/1965 | Wiberg ................. 114/279 |
| 3,205,846 | 9/1965 | Lang . |
| 3,364,892 * | 1/1968 | Persson et al. ............ 114/280 |
| 3,467,043 * | 9/1969 | Bowles ................. 114/278 |
| 3,504,649 | 4/1970 | Scherer . |
| 4,117,995 * | 10/1978 | Runge ................. 244/207 |
| 5,176,095 | 1/1993 | Burg . |
| 5,415,120 | 5/1995 | Burg . |
| 5,601,047 | 2/1997 | Shen . |

FOREIGN PATENT DOCUMENTS

| | | | | |
|---|---|---|---|---|
| 1421624 * | 12/1965 | (FR) | ................. | 114/274 |
| 7025 * | 7/1896 | (SE) | ................. | 114/67 A |

* cited by examiner

*Primary Examiner*—Sherman Basinger
(74) *Attorney, Agent, or Firm*—James Creighton Wray; Meera P. Narasimhan

(57) ABSTRACT

The invention is gas-filled cavities that reduce drag on the underwater surfaces of marine vehicles. Hydrofoils, struts, boat and ship hulls, pontoons, underwater bodies, fins, rudders, fairings, protuberances, submarine sails and propulsors are underwater surfaces that may be covered by the gas-filled cavities to reduce drag on them. The gas-filled cavities are to be used on underwater surfaces of marine vehicles, such as hydrofoil craft, monohulls, catamarans, SWATH (small waterplane area twin hull) craft, SES (surface-effect ships) and WIG (wing-in-ground effect) vehicles. Each gas-filled cavity is formed by ejecting air near the end of each nosepiece. Air is ejected at a speed and direction which is close to that of the water at the local cavity wall. The cavity is formed behind the nosepiece. The nosepiece is adapted to control the shape of the cavity. Cavity length is also controlled through controlling air ejection rates, and through the use of a tailpiece to close the cavity within a limited region near the front of the tailpiece.

99 Claims, 17 Drawing Sheets

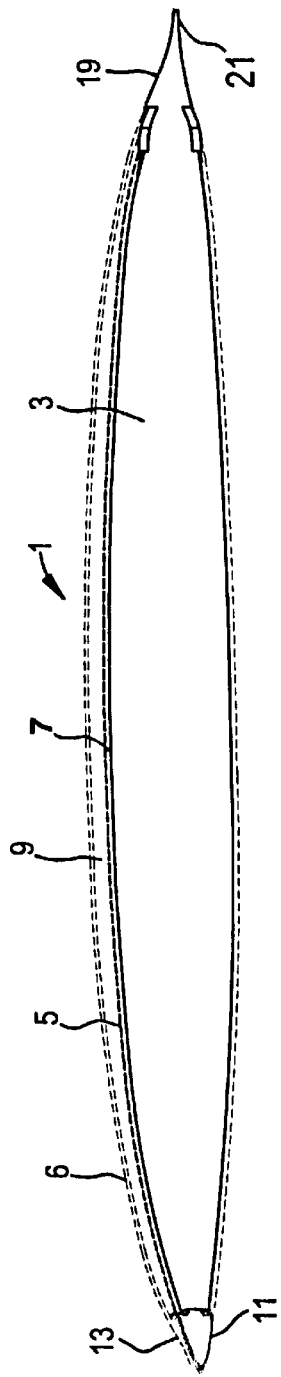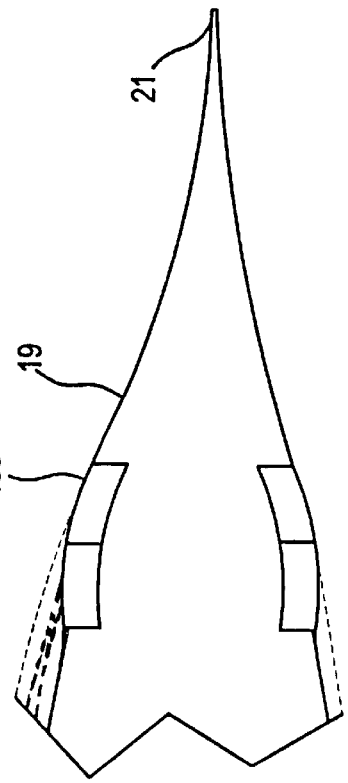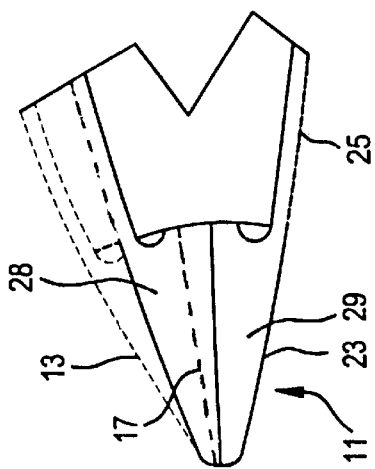

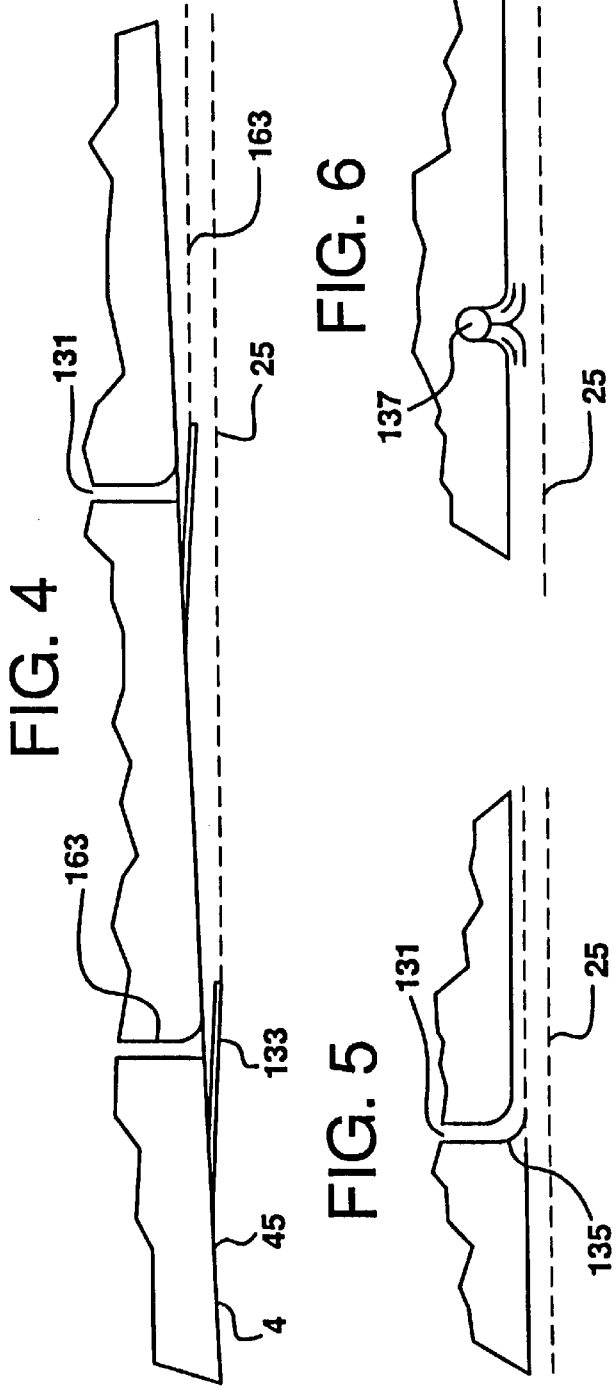
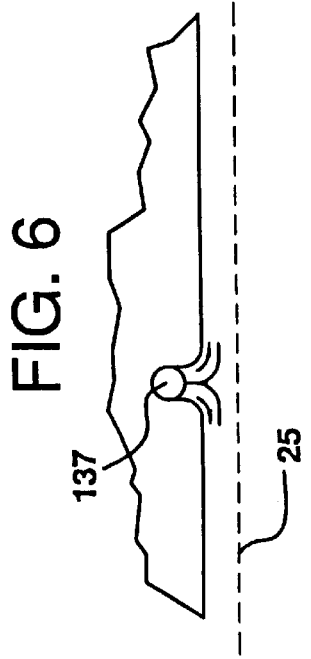
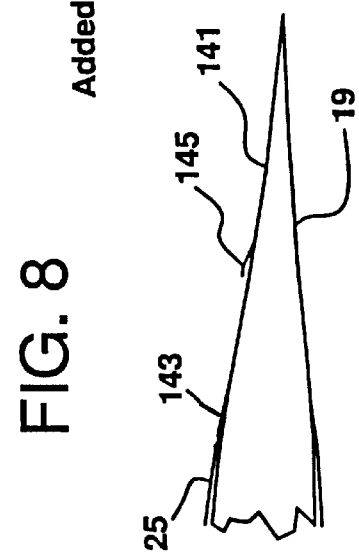
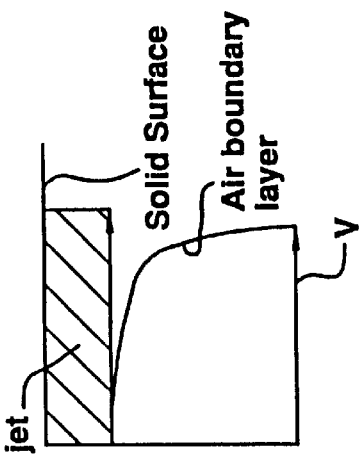
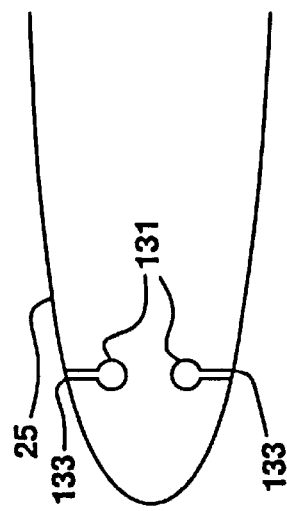

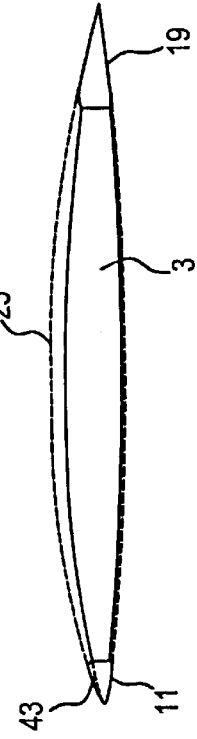
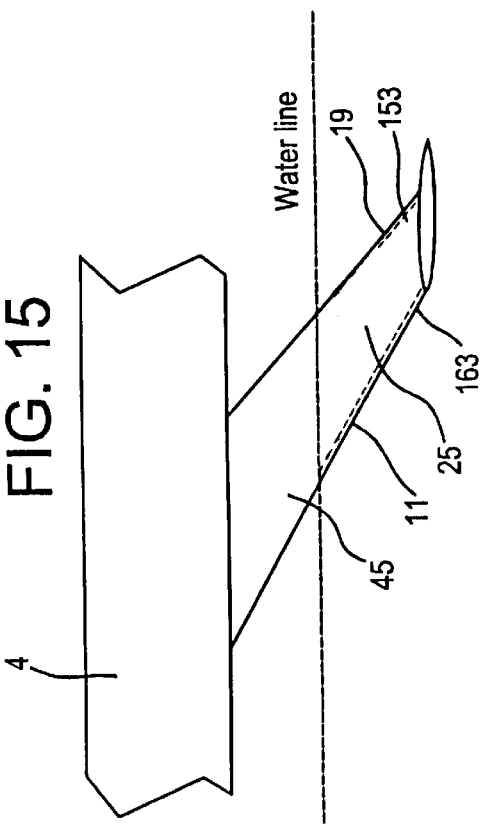
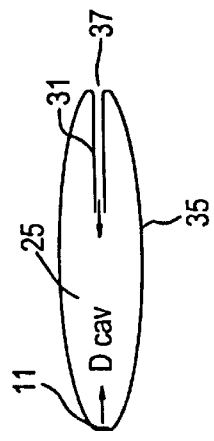
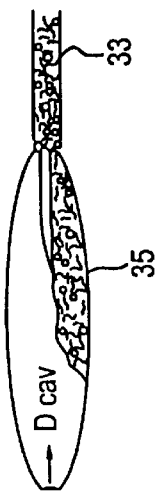
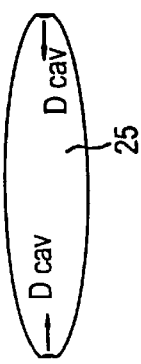
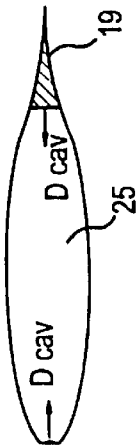

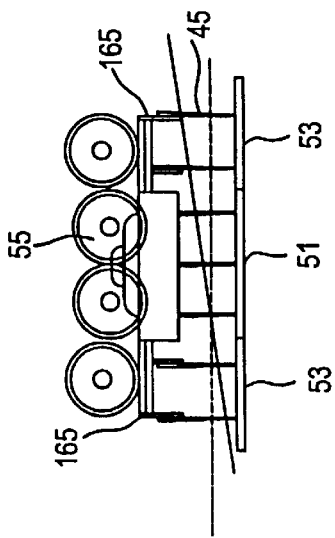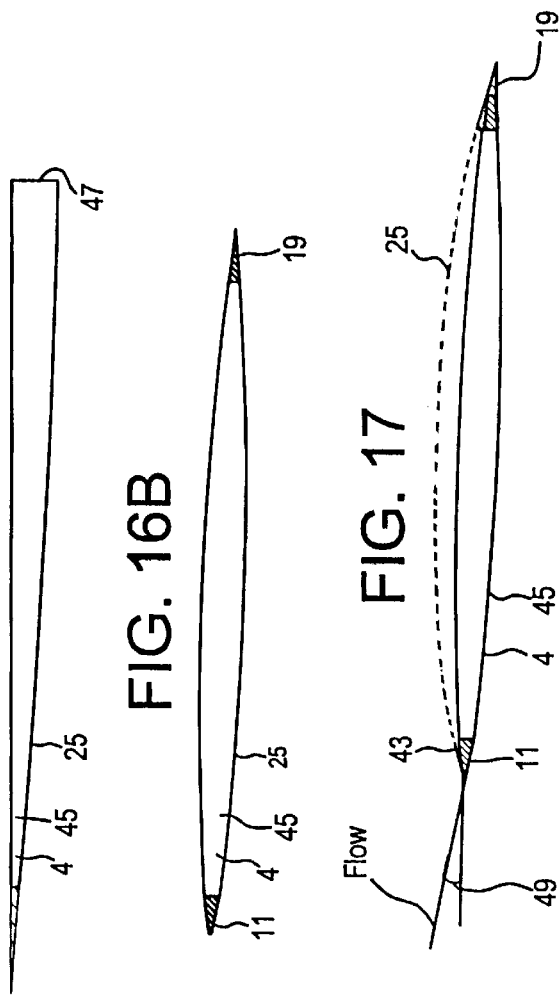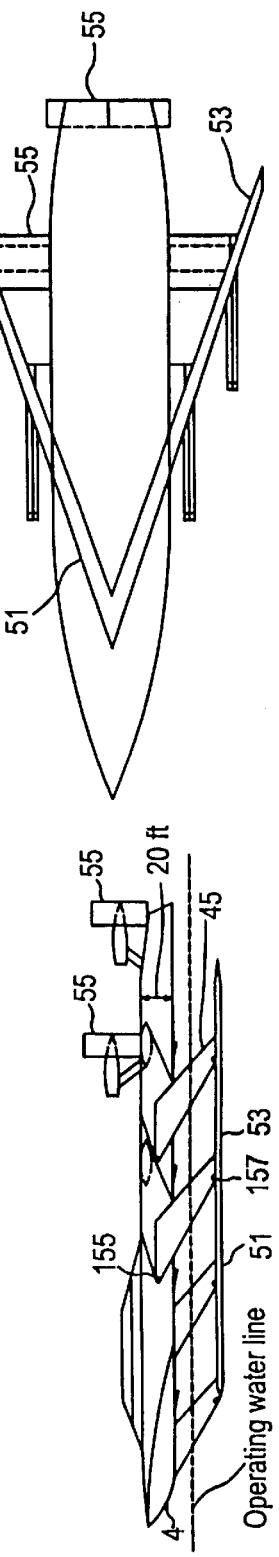

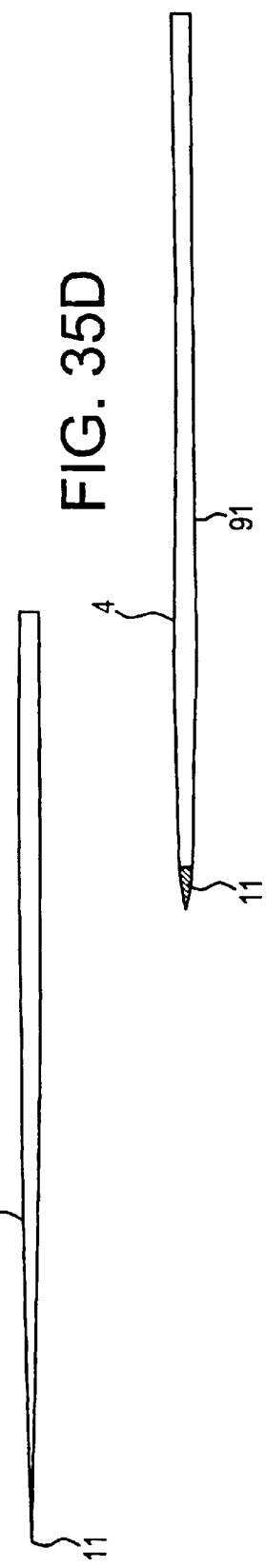
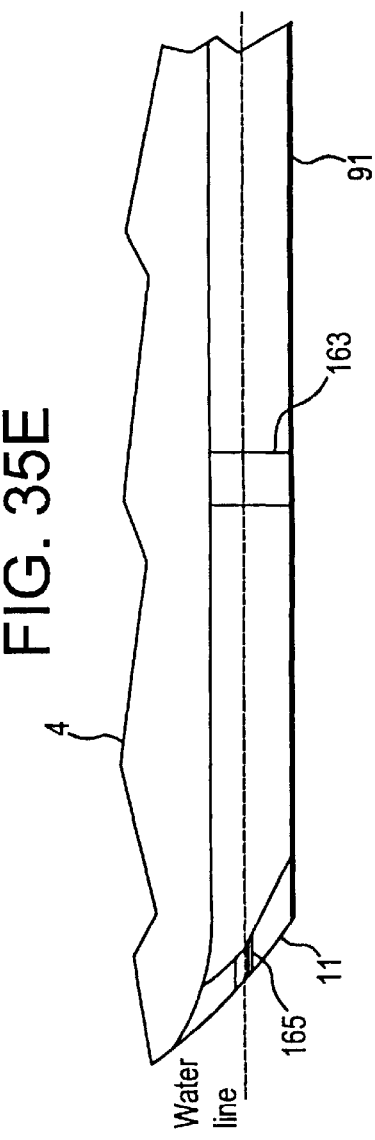
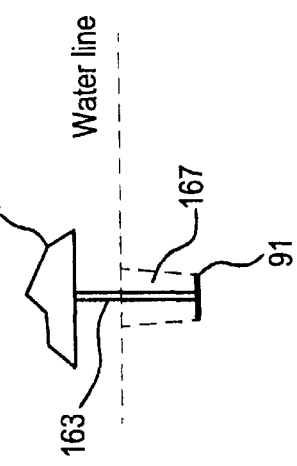
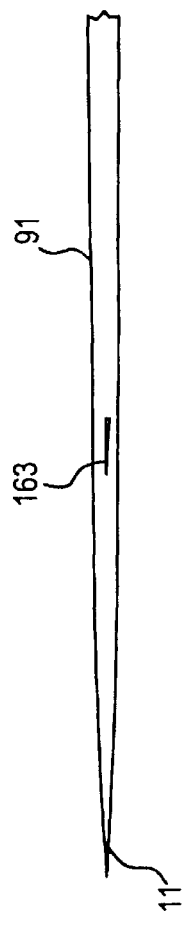

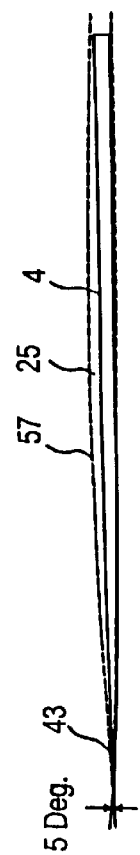
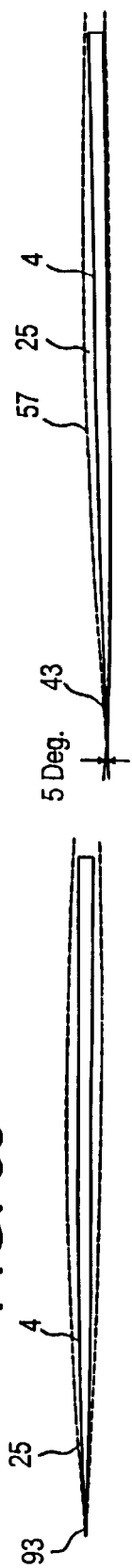
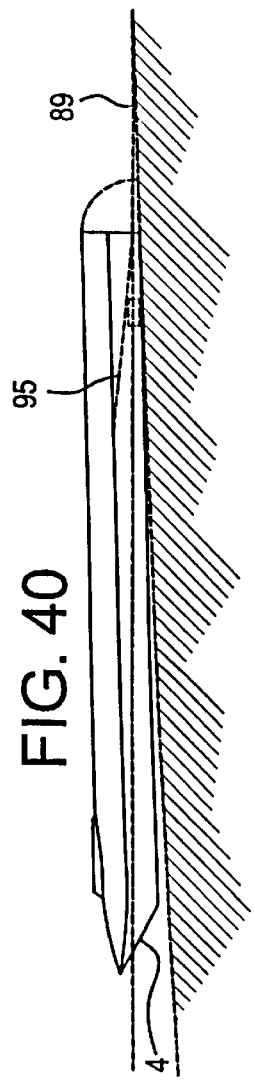
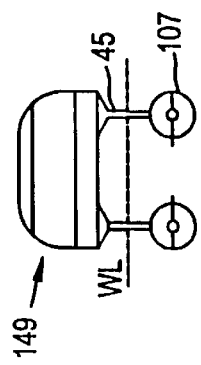
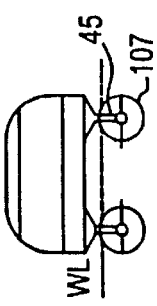
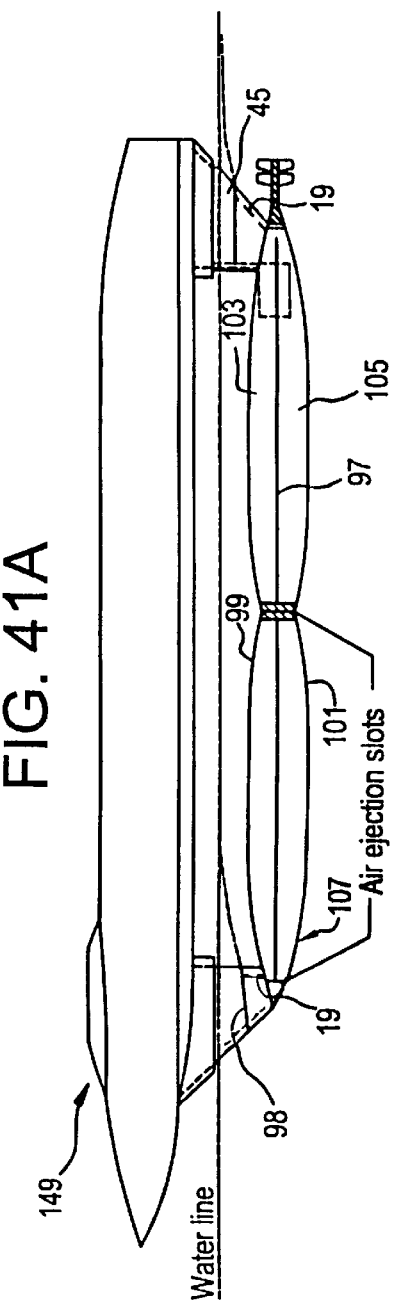

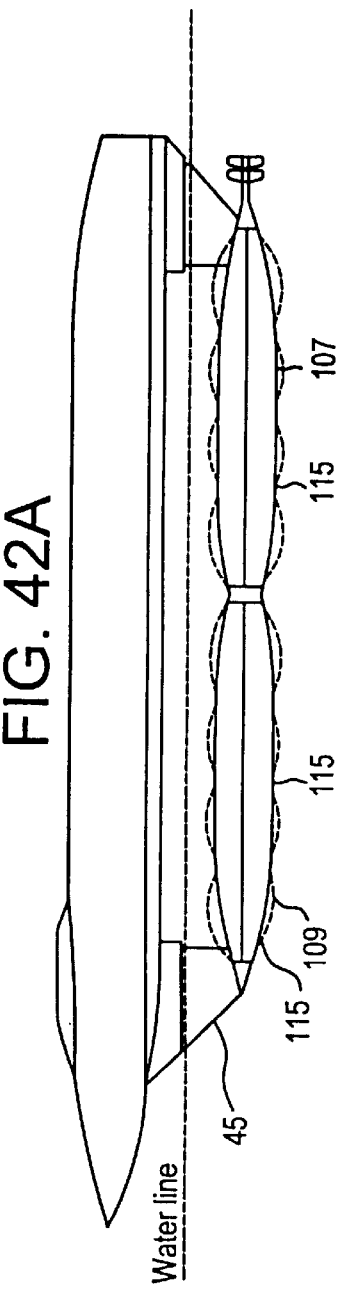
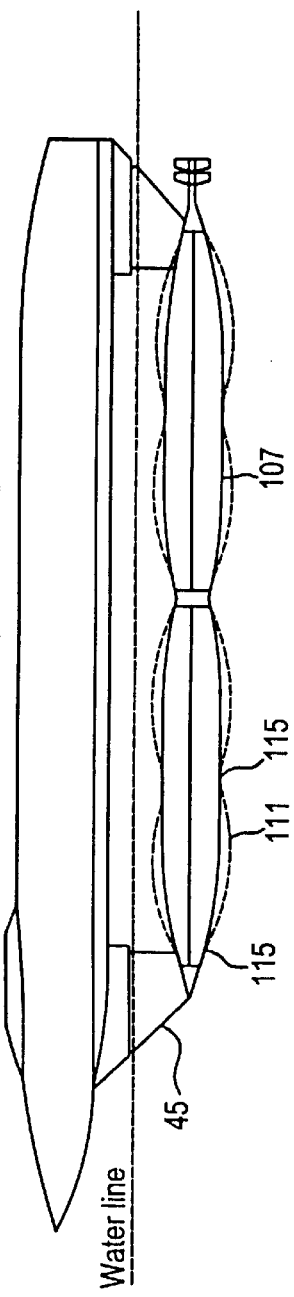
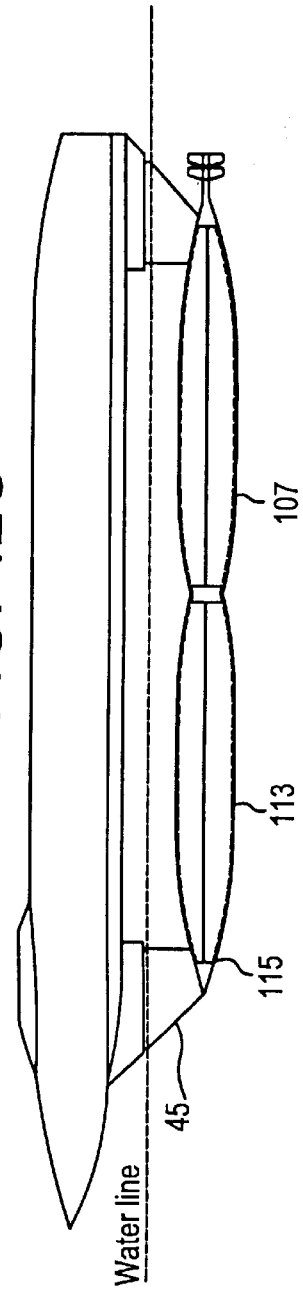

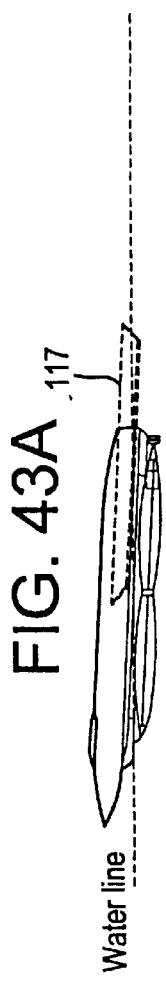
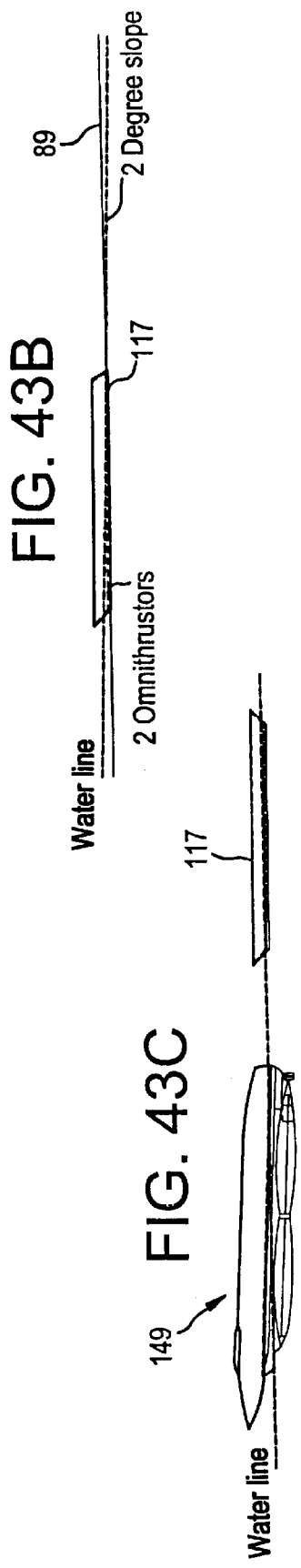
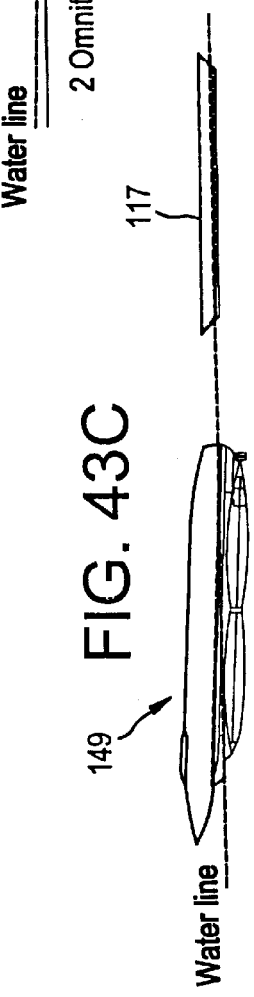
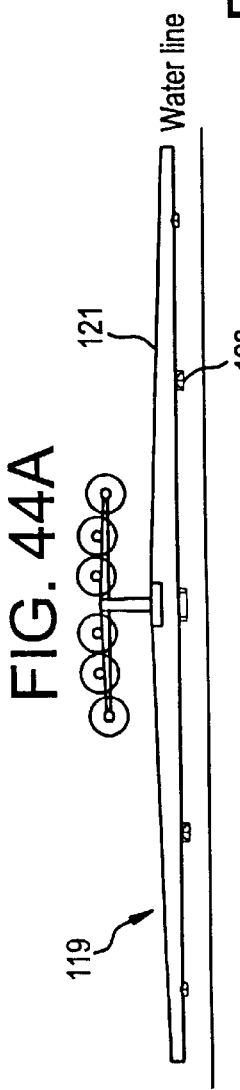
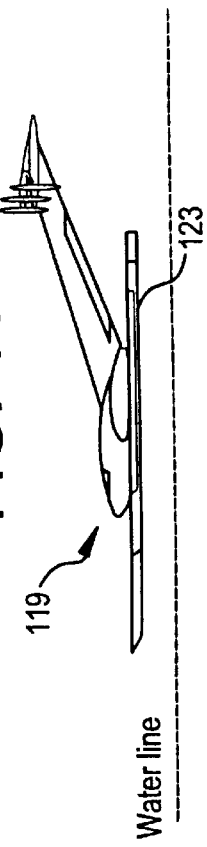

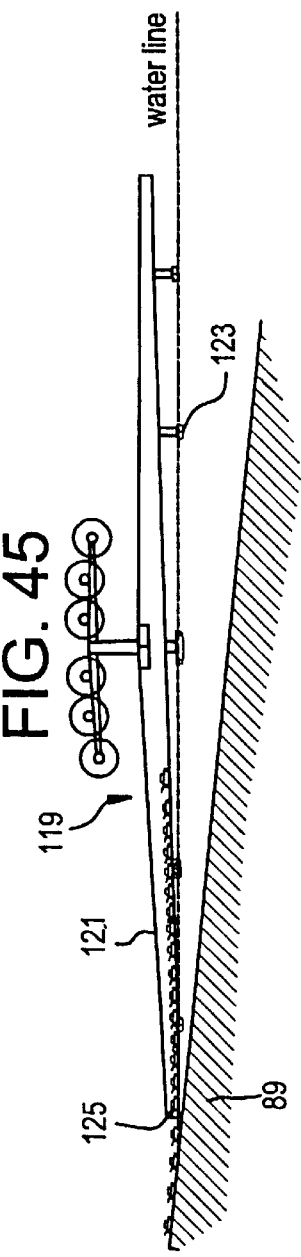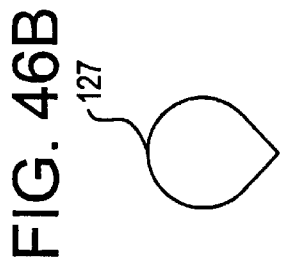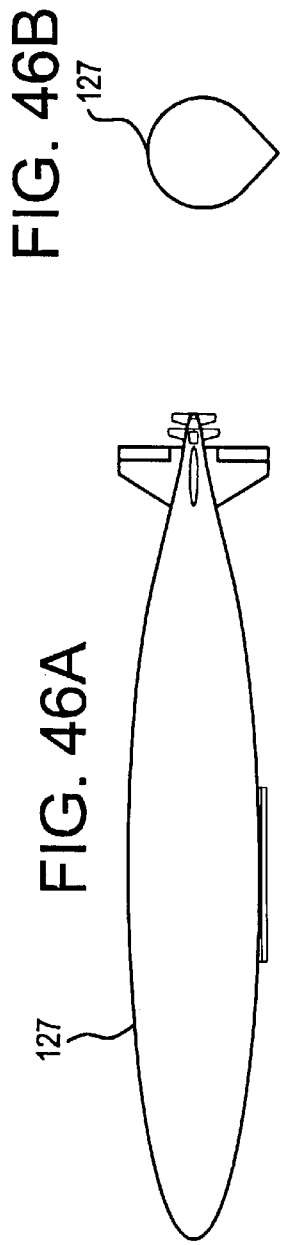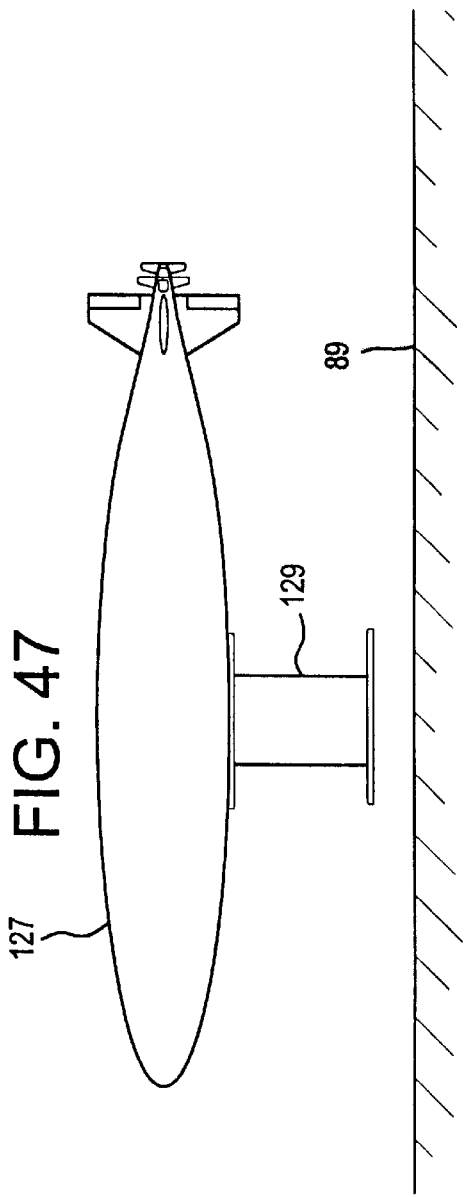

LOW-DRAG, HIGH-SPEED SHIP

This invention was made with Government support under DAAH01-96-C-R228 awarded by the Defense Advanced Research Projects Agency. The Government has certain rights in this invention.

BACKGROUND OF THE INVENTION

The invention applies to the field of hydrodynamics, and relates to the use of cavities to reduce the drag of ships, submarines, torpedoes, hydrofoils, surface-piercing struts, propellers, control surfaces, fairings, and in general, to any underwater surface.

Vapor filled cavities for reducing hydrofoil drag were patented by Tulin (U.S. Pat. No. 3,065,723) and Wennegal (U.S. Pat. No. 3,044,432); the latter patent included leading and trailing edge flaps. Low drag base-vented and side-vented hydrofoil concepts were patented a year later by Lang (U.S. Pat. No. 3,109,495). A low-drag submarine was patented by Lee about the same time wherein the speed was so high that a vapor-filled cavity is formed between an adjustable nose cone and a tail section (U.S. Pat. No. 3,041,992). However, that concept would not work because the submarine is in a constant-pressure vapor cavity which would not provide any lift to support the massive weight of a submarine. Control fins are shown, but these would be far too small to support submarine weight, and no teaching was included to use the fins in that manner. A different means for reducing torpedo drag was patented by Eichenberger in which a gas film was used to cover the surface of a torpedo in which the gas film is so thin that it would sustain the outside pressure changes due to depth and provide displacement lift to support the torpedo weight (U.S. Pat. Nos. 3,016,865 and 3,075,489). However, that concept appears to be complex, and would require accurately-machined surfaces. A different means for reducing torpedo drag by using a gas-filled cavity was patented by Lang in which lift is provided by nosepieces and tailpieces to support torpedo weight (U.S. Pat. No. 3,205,846). Claims in U.S. Pat. No. 3,504,649 include a provision for ejecting upper and lower sheets to reduce frictional drag on displacement hydrofoils; also included were air removal means. However, that patent suggests that the air supplied to the upper and lower surfaces comes from the same-plenum, and no mention is made that these air sheets are at different pressures in order to support the vehicle weight. If both air sheets are at the same pressure, one of the air sheets would break up into individual bubbles and lose its ability to reduce drag. Means to reduce thus drag on the lower surface of boats was patented by Baldwin (U.S. Pat. No. 1,656,411). That concept is somewhat like the modern SES (surface effect ship) concept. More recent ways to reduce the drag on boat bottoms have been patented by Burg (U.S. Pat. Nos. 5,176,095 and 5,415,120). A recent patent shows how drag can be reduced on hydrofoils by using a special cross-sectional shape which operates either fully wetted, supercavitating or base-cavitated depending upon speed (U.S. Pat. No. 5,601,047).

Marine vehicles are categorized as either displacement craft or dynamic-lift craft. Displacement craft derive their lift from buoyancy (displacement). Dynamic-lift craft derive their lift dynamically, such as by hydrofoils or planing surfaces. The drag of displacement craft is primarily frictional and wavemaking. The drag of dynamic-lift craft is primarily frictional and induced (drag induced by lift). In high-speed craft of either type, frictional drag is normally more than half the total drag. It is important to reduce frictional drag, although all types of drag are reduced to achieve a large lift-to-drag (L/D) ratio.

The following are dynamic-lift: hydrofoil ships, air cushion vehicles (ACV), seaplanes, wing-in-ground effect (WIG) craft, planing hydrofoil ships, surface effect ships (SES) and ram wing -craft. Displacement craft include: slender monohull ships, catamaran ships, SWATH (Small Waterplane Area Twin Hull) and displacement hydrofoil ships.

The need for reduction in frictional drag has long existed. Means for reducing frictional drag include laminarization, air cavities and air films, riblets, magnetohydrodynamics, microbubble ejection, polymer ejection and moving walls.

The invention provides an air-cavity drag-reducing system, larger-than-normal sweepback on hydrofoils and struts, and control of hydrofoil and strut dynamic forces by controlling their air cavities.

Drag and motion are reduced by factors of 6 or more compared with existing vehicles to transit 10,000 miles at 100 knots without refueling, and to limit vertical accelerations in 30-ft waves to around 0.1 g when either transiting or loitering offshore.

The new vehicles are built using conventional materials, machinery and manufacturing methods.

The benefits of these new vehicles include greatly reduced fuel consumption, longer range, higher speed and greatly improved seakindliness compared with state-of-the-art vehicles.

The new ships deliver a sizable military force almost anywhere in the world within 100 hours. That capability is most important in regions where airfields are unavailable. If immediate action is not required, then these new vehicles have the ability to loiter offshore, show a military presence and sustain troops for one month without resupply. Other military applications include missile launchers, V/STOL or conventional aircraft carriers, arsenal ships and patrol vessels.

Commercial applications include cost-effective ships for rapid delivery of perishable or high-value cargo, fast ferries, commercial fishing vessels and recreational craft. Those applications may be scaled down in size and speed.

SUMMARY OF THE INVENTION

The ship hull is supported above water by seven struts attached to a horizontal V-shaped hydrofoil unit which is swept back 70 degrees. The hydrofoil unit has a span of 261 ft, is optimized to operate at a depth of 22 feet, and consists of three independent, adjacent hydrofoils. The propulsion system uses four ducted air propellers, similar to those used on hovercraft. Alternative propulsors are underwater superventilating propellers and pumpjets. The power plants are either gas turbines or diesel engines, and provide the required 137,000 shp to cruise at 100 knots. To meet the range requirement, drag is reduced on the hydrofoils and struts by covering most of their underwater surfaces with air cavities. The struts and hydrofoils are automatically controlled for maintaining near-constant lift and sideforce to provide a near-level ride in up to 30-ft waves. Maneuvering is achieved by banking the ship into turns. Emergency turns and stops are augmented by lowering drag plates into the water.

The hydrofoil hull has a beam of 100 ft, and an at-rest draft: of 10 ft with hydrofoils retracted. In a preferred embodiment, the three hydrofoil sections retract rearward and upward. The hydrofoils are retracted when offloading onto a beach, when operating in shallow water or harbors, or when transiting the Suez Canal. Also, the hydrofoils automatically retract in a collision with an underwater obstacle. Alternative hydrofoils not only retract but fold against the hull to clear the Panama Canal. Offloading onto beaches with slopes as shallow as two degrees is done through the stern via four 20-ft-wide retractable ramps which are lowered after trimming the ship bow down one degree, and backing into shore. When loitering, the hydrofoils remain below water to help reduce motion, and air bags are attached to the hydrofoils to further reduce motion.

Vehicle weight (i.e., lift, L) is fixed. Reducing drag, D, is identical to achieving a high lift-to-drag ratio, L/D, a non-dimensional parameter useful in comparing different kinds of vehicles.

All sources of drag are reduced together with frictional drag to satisfy speed and range requirements. Induced drag is reduced by reducing lift per unit span. Wavemaking drag is reduced by reducing the beam/length ratio of ship hulls, by submerging hulls, or by strategically positioning multiple bodies to reduce the overall wavemaking drag.

To minimize seasickness and permit near-normal working conditions, accelerations are kept below around 0.1 g, and roll and pitch angles are kept below around 10 degrees. Higher accelerations are permissible for short periods, and the requirements are relaxed somewhat for unusual storm conditions. Few ship types can reach 100 knots, and no known ship types are able to meet the motion requirements at even moderate speeds in 30-ft waves. In ships or other vehicles following the wave surface at 100 knots, vertical accelerations greatly exceed the desired limit. The trajectory of a vehicle must be nearly level. To provide a near-level ride, some type of automatic control, or passive stabilization, system is used. Automatic control involves sensors, computers and controls. Passive stabilization includes the use of a small waterplane area, damping vertical motion, and/or mechanically isolating passengers from ship motion. Automatic control best satisfies motion requirements. Worldwide, the significant wave height (average of the ⅓ highest waves) does not exceed 5 m (16.4 ft) for 98.4% of the time. In the North Atlantic, that significant wave height is not exceeded 97.5% of the time. Therefore, a significant wave height of 5 meters appears to be a reasonable number for the design wave height. In such sea states, waves can occasionally be as high as 30 ft (9.14 meters). The vehicle needs to limit both vertical and transverse accelerations to 0.1 g in up to 30-ft waves.

Ship motions are caused by the orbital velocities of water particles in waves. A water particle at the surface of a wave follows a near-circular path whose diameter is the wave height. Although the speed of such a particle is nearly constant, its velocity vector migrates through 360 degrees during one period. Water particles beneath the surface follow a similar near-circular path, but their path diameters reduce exponentially with depth.

Waves affect ship motion by changing the following four variables: 1) surface elevation, 2) angle of attack, 3) angle of yaw, and 4) forward speed. A ship designed to travel without significant vertical or sideward acceleration through waves must: overcome the change in force produced by changes in these four variables.

The new hydrofoil ship ideally follows a level trajectory. The lift on its hydrofoils remains nearly constant and independent of wave-induced effects, such as angle of attack. The hydrofoils are controlled to cancel the lift change otherwise produced by a change in angle of attack. To control a hydrofoil, it is necessary to know the change in angle of attack induced by a wave.

The conclusions drawn from this wave analysis are:
a) a 100-knot ship must follow a relatively-straight trajectory, independent of waves,
b) angles of attack in pitch and yaw induced by waves are small but significant,
c) changes in velocity induced by waves are small but significant, and
d) all wave-induced effects significantly reduce with depth, especially for shorter waves.

The ability to reach speed can be a critical problem for high-performance, dynamic-lift craft. A ship capable of operating at. 100 knots strongly depends upon drag reduction. The ship might not be able to takeoff, or reach speed. Therefore, ship power requirements are explored at takeoff and other speeds to determine if a ship has sufficient power to reach design speed.

State-of-the-art propulsion systems are used for the vehicles. Diesel engines provide the lowest fuel consumption, and cost less than gas turbines. Alternatively, gas turbines are much lighter and smaller than diesels. Either type is acceptable for the vehicles. At 100 knots, conventional propellers cavitate. Supercavitating propellers, super-ventilating propellers, water jets or ducted air propellers are employed. The drive system is either mechanical, electrical, or hydraulic. Mechanical systems, are the most efficient; electric systems provide good design flexibility, but are heavy; and hydraulic systems are smaller and lighter than the others, but lack efficiency.

The maximum beam permitted by the Panama Canal is 106 ft, which provides a clearance of one foot on each side. Typical 10,000 ton ships can clear this canal. However, the span of hydrofoils on hydrofoil ships greatly exceed this beam limit. Folding of the hydrofoils is needed. On the other hand, the Suez Canal is 390 ft wide at the surface and 118 ft wide at the bottom where the depth is 46 ft. The hydrofoils do not require folding, but require retracting.

2,000 tons of equipment and 500 troops are to be offloaded onto an unimproved beach without the use of support vehicles. If the transport vehicle hull has a shallow draft, then offloading is accomplished by trimming the vessel, and offloading directly onto a beach. Alternatively, floating bridges, or other devices, are provided. It is necessary to clear mines and secure the local region before offloading. Advance information on beach contour and local bottom profiles is necessary.

All candidate ships are able to loiter offshore for a month without exceeding vertical accelerations of around 0.1 g. The one-month period provides time for replenishment. Some vehicle types like SWATH ships inherently have low motions at rest. For others, motion-reduction means is employed.

Collisions with other craft and with submerged objects at 100 knots must be avoided. Chances of such collisions are minimized by using state-of-the-art sensors, direct observation, and a global positioning system in conjunction with accurate maps, real-time satellite data and other information on the location of other craft and underwater obstacles. Collisions with large sea animals are rare, but are avoided by transmitting high-intensity underwater sound beams to deter sea animals and drive them away from the vehicle's path. To help avoid collisions, it is necessary to maneuver quickly and/or reverse thrust. The probability of collisions is minimized by minimizing ship beam and draft. Damage in the case of collisions is minimized by compartmentalization, energy absorbers, and/or retracting or releasing vulnerable appendages such as hydrofoils.

If ship drag is reduced by a large factor, then current ship structure and outfitting are used, and still satisfy the design conditions. Alternatively, very light-weight structural materials, vehicle components, and ship systems are used to carry enough fuel for the otherwise large propulsion systems; however, ship costs greatly increase. Therefore, drag reduction is extremely important in reducing ship cost.

In any case, weight reduction is beneficial unless the increased cost overrides the advantages of reduced weight. Ship structural weight is reduced significantly by using aluminum instead of steel; however, ship cost increases, Steel is currently favored in this size range. Alternatively, new structural concepts and outfitting concepts reduce weight without increasing cost.

The invention reduces drag on the underwater surfaces of marine vehicles by covering the surfaces with gas-filled cavities. The underwater surfaces include hydrofoils, struts, boat and ship hulls, pontoons, underwater bodies, fins, rudders, fairings, protuberances, submarine sails and propulsors. In most cases, air is the preferred gas. As used herein, the word "air" is synonymous with the word "gas", and "cavity" is synonymous with "gas-filled cavity".

The types of marine vehicles which benefit from this invention include those which operate at the water surface, under the water, and in the air. Examples of surface vehicles are hydrofoil craft, monohulls, catamarans, SWATH (small waterplane area twin hull) craft, and SES (surface-effect ships). Underwater craft include submarines and torpedoes. Air vehicles include water-based WIG (wing-in-ground-effect) vehicles and seaplanes.

The drag-reduction invention applies to combinations of vehicles, propulsion systems and underwater surfaces, wherein at least one of them incorporates at least one wetted nosepiece. At least one gas-filled cavity is formed behind each nosepiece to cover an underwater surface. The nosepieces have controls to control the shapes of said cavities.

In most cases, the cavities are formed by ejecting air from near the end of each nosepiece. Air is ejected at a speed and direction which are close to those of the water at the local cavity wall. Air optionally is ejected at one or more stations downstream of said nosepiece.

Fences are attached to underwater surfaces to separate adjacent cavities. Fences include a wetted region on said underwater surface, a wetted strip of material attached to said surface or a dynamic curtain of moving water, gas or other fluid.

The local cavity thickness is the distance between an underlying surface and the local cavity wall. Local cavity thickness is controlled so that the local cavity air speed is approximately equal to the local water speed at the cavity wall. Local cavity thickness is a function of the airflow rate and includes the local thickness of the air boundary layer which builds up along the underlying surface.

Tailpieces provide air removal. In most cases, one or more tailpieces are used to smoothly close cavities and redirect the water flow back to the free-stream direction. Air is optionally removed from a cavity by an air-removal device which preferably is located near the forward part of a tailpiece, and is attached to the tailpiece.

Air is recycled. Air which is removed from a cavity is recycled by pumps which re-energize the air so that it can be re-injected into a cavity. Air is removed at some station along a cavity, re-energized with a pump and re-injected at or near that station.

Nosepieces have controls. A nosepiece control for a hydrofoil or strut includes a flap located on each side of the nosepiece which pivots outward about a spanwise axis positioned near the leading edge. A spanwise air plenum, or one in each flap, supplies air to a slot-like nozzle located at the flap trailing edge such that a curtain of air is ejected tangential to the trailing edge of the flap, and at a speed close to the local water speed. Moving a flap outward on one side enlarges the cavity on that side.

Lift control is provided by controlling cavity thickness. When a nosepiece flap is used to increase cavity thickness on one side of a hydrofoil or strut, the camber of the virtual hydrofoil is increased on that side, resulting in an increase of dynamic lift on that side. By "virtual" is meant the hydrofoil-like shape, consisting of the combination of wetted surface and cavity, which hydrodynamically acts much like a solid hydrofoil surface. Virtual hydrofoil shape, and its associated lift, are changed by varying the cavity thickness on one side or the other of a hydrofoil.

Tailpiece control may be employed. When a tailpiece is used, and when the size or shape of a cavity is changed by the nosepiece, it may be desirable to change the shape of the tailpiece to more-smoothly close the cavity and to conform with changes in camber. One tailpiece control is an outwardly-movable flap which pivots about a transverse axis located near the trailing edge. To seal the gap when the flap is moved outward, a flexible or a segmented air removal means is placed between the flap leading edge and the fixed underlying surface. A preferred tailpiece control is to simply rotate the tailpiece unit like a single flap which pivots about its leading edge.

Cavity length is controlled. For a given nosepiece flap angle, the rate at which air is removed from a cavity affects cavity length. Some air entrains naturally out of the end of a cavity and forms a bubble-filled wake. In cases where a tailpiece is used, it is important to control cavity length so that the cavity closes within a limited region near the front of the tailpiece. The primary control of cavity thickness is deflection of a nosepiece flap. The primary control of cavity length is limitation of the airflow rate, thereby limiting cavity length. Cavity length increases when the airflow rate increases. A better and faster means for controlling cavity length is to provide an airflow rate which exceeds the natural air entrainment rate, and then to remove the excess air near the end of the cavity. By doing that, cavity length can be controlled fast enough to compensate for changes caused by waves, maneuvering and speed changes. One way to control cavity length is to position the air removal means to cover a limited region at cavity closure, to provide air removal which removes only air and (ideally) not water, and to provide a suction to remove air at a rate faster than the ejected airflow rate. Consequently, if the air removal means is covered with water, then the air removal rate is zero and the cavity will grow longer. Alternatively, if the air removal means is fully covered with air, then the air removal rate exceeds the air supply rate, and the cavity will grow shorter. Air removal devices include a fine-mesh screen, a porous material, or a slot. If water passes through the air removal means, water is separated from the air and pumped outside.

Control sensors are employed. As part of an automatic control system, sensors are used to determine system inputs, such as location and/or thickness of cavities, flow angle approaching the nosepiece, vehicle speed, vehicle accelerations, vehicle turn rate, local component depth, and wave effects.

Hydrofoils are three-dimensional. The upper and lower cavities on hydrofoils are separated by wetted nosepieces and wetted tailpieces. The cavities must also be separated by fences at the ends of each hydrofoil, unless the wetted nosepieces and tailpieces join at the ends. To reduce the drag of a superventilated hydrofoil where the upper surface cavity extends past the trailing edge, the lower surface is covered with a higher-pressure cavity which terminates on an underside tailpiece section. When not superventilated, each upper and lower cavity terminates near the front of a tailpiece. The cavities are controlled as described above.

The hydrofoils employ fences. Because hydrofoil craft preferably bank in turns to eliminate sideforce, the depth along a hydrofoil span varies, causing a variation in cavity pressure along the span. This variation in pressure causes air to flow spanwise from a higher pressure region into a lower pressure region. This spanwise flow is reduced by placing fences along the span which lie nearly parallel to the oncoming water flow.

The invention provides strut drag reduction. To reduce drag on surface piercing struts, a separate cavity is formed on each side behind a wetted nosepiece. Drag in the upper regions of struts is reduced the most if tailpieces are not used, and the two cavities are permitted to join and extend well beyond the trailing edge. In the lower strut regions, tailpieces are used to minimize drag. The cavities are preferably at atmospheric pressure. Air can either be ducted from the atmosphere and ejected through slots to fill cavities, or left to entrain naturally from the atmosphere. To minimize drag, the nosepiece shape, and cavity shape and underlying strut shape vary with depth. Segmented nosepieces can be controlled as a function of depth. At the junctures between struts and hydrofoils or underwater bodies, fences separate any adjacent cavities.

The invention provides hull drag reduction. To reduce drag on ship hulls, such as a catamaran hull, separate cavities are formed on each side of each hull behind wetted nosepieces, much like in the upper region of struts. Drag is generally minimized if tailpieces are not used. The cavities are created to extend behind the hull. The cavities are preferably operated near atmospheric pressure. Air is pulled from the atmosphere to fill the cavities. Because of wave action and maneuvering, additional air ejection slots are placed along each side of the hull. Since cavity convexity increases with depth, the nosepiece width and/or length increases with depth. Because side cavities provide no vertical lift, the hull bottoms are separated from these cavities and operate at close to depth pressure. To minimize drag on a hull bottom, a cavity covers most of the bottom. Fences isolate the bottom cavity from the side cavities. Air is pumped into the bottom cavity from the atmosphere. Pump power is minimized by removing the air near the trailing edge of the bottom surface and recycling it. Dynamic lift and its associated drag are eliminated or minimized if the displacement of the cavities and underwater surfaces is about equal to vessel displacement.

The invention provides submerged bodies with fences. Drag is reduced on submerged bodies in a manner similar to reducing drag on hydrofoils. Lift to support vehicle weight is preferably provided by covering the upper half of a body with a low-pressure cavity and covering the lower half with a high-pressure cavity. The two cavities are separated by a horizontal fence. To eliminate dynamic lift, the displacement of the combined cavities and wetted surfaces must equal vehicle weight. Nosepieces and tailpieces for underwater bodies are similar in function to those of hydrofoils, except that they are three-dimensional in shape. Nosepiece flaps move outward and are made from overlapping segments or from a flexible material. An alternative nosepiece control is a clamshell-like nosepiece flap which pivots outward about a transverse horizontal axis located near the nose. Appropriate changes are made in body shape to maintain cavities when the flaps are deflected. To generate the necessary centripetal force for turning, one option is to roll the body several degrees and reduce the upper cavity pressure. Another option is to add a pair of fences positioned at 90 degrees to the horizontal fences, and vary cavity pressure in each quadrant to control sideforce and lift.

Cavities drive air turbines. To generate power, an air turbine is positioned in the duct leading from the atmosphere to any cavity which has lower than atmospheric pressure. Power is transferred to an air pump or to the general ship power system either electrically, hydraulically or mechanically such as by connecting turbine and pump shafts with appropriate gearing.

The invention minimizes the effects of waves. Waves produce local changes in depth, speed and flow angles. These local changes affect the dynamic forces generated on hydrofoils, struts and underwater bodies. To minimize these local force changes, nosepiece flap angles are automatically controlled, together with airflow rates and tailpiece flap angles. By positioning hydrofoils or bodies to operate at greater depths, wave effects are significantly reduced. They reduce exponentially with depth. Another way to reduce effects is to sweep back hydrofoils and struts. The effects of waves reduce with the cosine of the sweep angle. Wave effects are reduced by half with a sweep angle of 60 degrees, and reduced by a factor of three with a sweep angle of 70.5 degrees. Also, wave-induced flow angles reduce inversely with vehicle speed, so higher speeds are advantageous. If wave effects are small enough, automatic control may not be needed to attain acceptable seakindliness.

The invention applies to different kinds of vehicles. Hydrofoil ships may use swept-back hydrofoils, added fences, added struts, etc. Catamaran ships use drag-reduced hulls, no tailpieces, segmented nosepieces whose segments are independently controllable, and multiple flaps with air ejection slots located along each side of each hull, and optional air layer along the bottom with fences separating the side and bottom cavities, and optional control fins. SWATH ships have twin-bulb lower hulls with two air ejection slots on each to cover the speed range, retractable struts, strut drag reduction, control fins, etc. WIG hulls and seaplane hulls use air ejection along the bottom of the hulls during takeoff and landing, and optional air ejection along the hull sides.

Applications include tanker ships, and many kinds of commercial and pleasure craft.

These and further and other objects and features of the invention are apparent in the disclosure, which includes the above and ongoing written specification, with the claims and the drawings.

BRIEF DESCRIPTION OF THE DRAWINGS

Table I summarizes the effects of various take-off speeds on lift and C1 for a 10,000-ton hydrofoil ship.

FIG. 1 is a schematic representation of a hydrofoil cross-section showing a nosepiece, a tailpiece and gas-filled cavities.

FIG. 2 is a schematic detail of the nosepiece shown in FIG. 1.

FIG. 3 is a schematic detail of the tailpiece shown in FIG. 1.

FIG. 4 is a schematic representation of air flaps.

FIG. 5 if a schematic representation of a slot alternative.

FIG. 6 is a schematic representation of re-energizing air.

FIG. 7 is a schematic representation of a leading edge cross-section.

FIG. 8 is a schematic representation of a trailing edge cross-section.

FIG. 9 is a schematic representation of an air boundary layer profile being reenergized by an air jet.

FIGS. 12A, 12B, 12C and 12D illustrate cavity drag and how it is canceled.

FIG. 13 shows the tail piece consisting of two S-shaped surfaces.

FIG. 14 shows controlling hydrofoil lift through cavity shape.

FIG. 15 shows the use of air cavities to reduce strut drag.

FIGS. 16A and 16B are cross-sections of a strut or hull at shallow and deep depths.

FIG. 17 shows the change in strut or hull cross-section required to eliminate side force when yawed.

FIGS. 18A, 18B and 18C are side, end and bottom views of a hydrofoil ship.

FIGS. 35A, 35B, 35C and 35D are end and side views of a low-drag, 100-knot catamaran ship, and hull cross-sections.

FIGS. 35E, F and G are side, top and end views of an alternative single hull which is located above water, and supported by a nose piece, bottom plate and a strut.

FIG. 38 is a cross-section of a catamaran hull at the surface showing nose piece deflections required at half-speed.

FIG. 39 a cross-section of a catamaran hull showing nose piece deflections required to counteract a 5 degree wave-induced yaw angle at full speed.

FIG. 40 illustrates a catamaran ship offloading onto a beach.

FIGS. 41A, 41B and 41C are side and end views of a low-drag, 100-knot SWATH ship.

FIGS. 42A, 42B and 42C are cross-sections of the SWATH ship illustrating the effect of lower speeds on SWATH ship hull cavities.

FIGS. 43A, 43B and 43C are cross-sections of a SWATH ship offloading, unloading and reloading onto an unimproved beach.

FIGS. 44A, 44B, 44C, 44D and 44E are front, side and bottom views of a 250-knot, 10,000-ton WIG ship.

FIG. 45 illustrates a WIG ship offloading onto a beach.

FIGS. 46A and 46B are a side view and cross-section of an airship capable of carrying a 2000 lt payload.

FIG. 47 illustrates an airship lowering the payload module to the ocean surface.

DETAILED DESCRIPTION OF THE PREFERRED EMBODIMENTS

Figure 10:
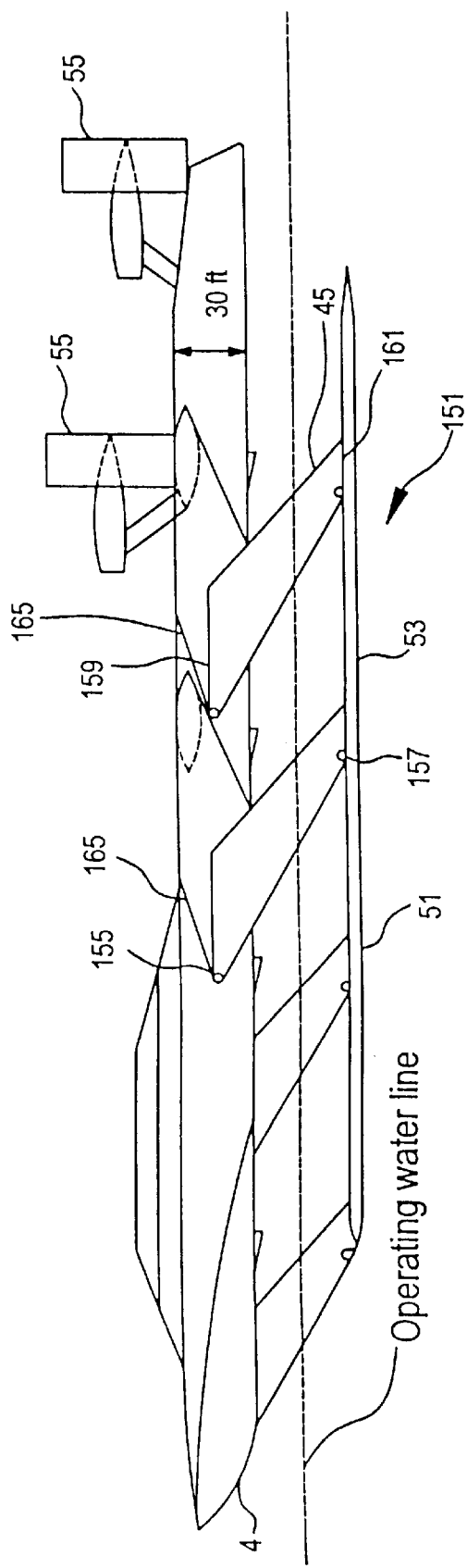
FIG. 10 is a side view of a new 100 knot, 10,000 ton, 10,000-nmi hydrofoil ship.

In FIGS. 1–3 of low-drag cavities 1 applied to a hydrofoil 3, the "dashed" lines 5 and 6 indicate cavities 7 and 9 before and after nosepiece 11 deflection. The dashed lines 13 also show the upper part of the upper nosepiece 11 after being deflected outward. A dashed line 17 shows the rest of the upper nosepiece which is also deflected outward. The upper part of the nosepiece deflects outward as a unit.

In the embodiment shown in FIG. 3, the tailpiece 19 is rigid and fixed to simplify the structure and control. Ideally, the tailpiece trailing edge 21 is canted slightly downward when the upper nosepiece is pivoted upward. In some cases the added complexity is not worth a small improvement in efficiency. Suction plenums 153 capture air from the cavity for recycling to the air source plenums 28. Two suction plenums are shown on each side wherein the forward one is used for thinner cavities, and the rearward is used for thicker cavities.

The lower nosepiece 23 is deflected downward to reduce lift, if needed, to reduce any increase in lift caused by a wave, to increase cavity 25, or to prevent the lower surface from being wetted in a wave.

Each part of the nosepiece 11 is designed to deflect only outward because there is no need to ever deflect the nosepiece parts inward. The nosepieces include plenums 28 and 29.

An air cavity is used to reduce wetted surface area, and thereby reduce frictional drag. The term "air cavity" is defined as a finite-length, air-filled, essentially-constant-pressure cavity generated on the surface of an underwater body such as a hydrofoil, strut or hull, and which does not extend beyond the wetted surface, unlike superventilated cavities. It is noted that air cavities, as defined, are distinct from air films which are so thin that they can support a pressure difference across the film thickness due to air viscosity.

Air cavities are easily generated, as are superventilated air cavities. Those familiar with surface-piercing struts or hydrofoils know that parts or all of their surfaces can suddenly ventilate (i.e., "superventilate") under certain conditions. As shown in FIGS. 4 and 7, air is drawn from a source 131 into a low-pressure region on the strut 45 or hydrofoil 4, resulting in a cavity 25. Air from air supply 131 exits through air jet 163 forcing flaps 133 open to form a cavity on the strut 45 or hydrofoil 4. In an alternate embodiment shown in FIG. 5, the flap 133 may be replaced with a slot 135. Torpedoes fired into the water from a ship or helicopter will superventilate down to a considerable depth. Alternatively, finite, non-superventilated air cavities are easily formed in low-pressure regions of an underwater surface, if sufficient air is injected under the right conditions.

Considerable research has been conducted on air cavities in water tunnels, water channels, and at water entry test facilities. References on air cavities show the ease with which they are generated, and provide useful information on cavity shape and size as a function of cavity pressure and water speed. Covering most of the area of an underwater surface with air reduces frictional drag, possibly by large factors. The upper and lower surfaces of a hydrofoil are covered with air because covering only one surface limits drag reduction to a factor of around 2. The use of air cavities is the preferred method of drag-reduction.

After weighing the advantages, disadvantages and overall potential of the different drag reduction methods, the air cavity method is the most feasible for near-term use.

Air cavities are easily generated. They are formed either naturally by receiving air direct from the atmosphere, or mechanically by using ducts 135, shown in FIG. 5, and pumps 137, shown in FIG. 6, to inject air. In either case, an essentially-constant-pressure cavity is generated, and will remain as long as sufficient air is supplied. As shown in FIG. 8, the cavity 25 smoothly closes 143 just ahead of the cusp 141 of the tailpiece 19. A water sensor 145 is employed to help determine the location of an air cavity 25. FIG. 9 shows how the air boundary layer is reenergized by the addition of an air jet.

A side view of the new hydrofoil ship is shown operating at design speed in FIG. 10. The ship hull is supported above water by seven struts 45 attached to a horizontal vee-shaped hydrofoil unit 151 which is swept back 70 degrees. The hydrofoil unit 151 has a span of 261 ft, is optimized to operate at a depth of 22 feet, and has three independent, adjacent hydrofoils 51, 53. The hydrofoils 51, 53 are connected to the struts 45 through lower horizontal pivots 157. The struts 45 are connected to the hull 4 by upper horizontal pivots 155. The pivots 155, 157 allow the hydrofoils 51, 53 to be drawn up to the hull 4. The four aftmost struts 45 are connected to the hull through outward extensions 165. The propulsion system uses four ducted air propellers 55, similar to those used on hovercraft. Alternative propulsors are underwater superventilating propellers and pumpjets. The power plants are either gas turbines or diesel engines and provide the required 137,000 shp to cruise at 100 knots. To meet the range requirement, drag is reduced on the hydrofoils and struts by covering most of their underwater surfaces with air cavities. The struts and hydrofoils are automatically controlled for maintaining near-constant lift and sideforce to provide a near-level ride in up to 30-ft waves. Maneuvering is achieved by banking the ship into turns. Emergency turns and stops are augmented by lowering drag plates into the water.

Figure 11C:
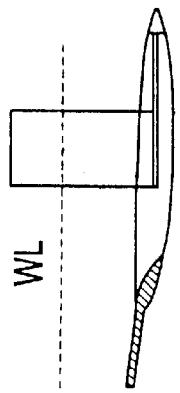
FIGS. 11A, 11B and 11C show examples of air cavities.
Figures 11A, 11B:
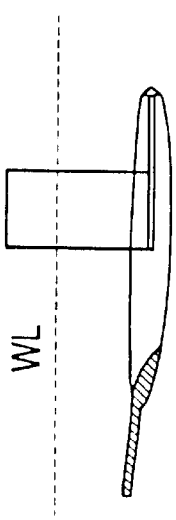

FIGS. 11A, 11B and 11C show photographs of superventilating air cavities 25 generated by three different nose piece shapes. The water flow is from right to left. Higher speeds produce longer and slimmer cavities with less upsweep due to buoyancy. Tests on air ejection through the surfaces of two-dimensional hydrofoils show that cavities can greatly change hydrodynamic forces. Also, air cavities form naturally when high-speed objects enter the water. Those natural cavities accompany the objects to surprisingly deep depths. The nose pieces in FIGS. 11A through C are supported by a sting mount, which is seen through the transparent cavity. The sting, in turn, is supported by a vertical strut which is seen in each of the three views. The cavities collapse several nose-piece-diameters downstream of the nose pieces. The upper nose piece is a flat disk, and the lower nose pieces are cones with different cone angles. All nose pieces have the same diameter.

Considerable research has been conducted on air cavities in water tunnels, water channels and towing tanks which provide information on cavity shape as a function of wetted surface shape and nondimensional Cavity Number. The shape of a cavity is essentially the same as that of a constant-pressure solid body. Considerable theoretical information is available on constant-pressure cavity flow and on constant-pressure hydrofoils and bodies. Neglecting buoyancy, the shape of a 2-dimensional cavity is an ellipse.

Cavity buoyancy affects cavity shape. A horizontal cavity is swept upward by buoyancy, caused by the gravitational field of the earth. The depth pressure of water acting on the lower side of a cavity is greater than on the upper side, thereby causing the cavity to sweep upward as seen in FIGS. 11A through 11C. The amount of cavity upsweep depends upon the ratio of dynamic force to gravitational force, otherwise known as the Froude Number.

As the Froude Number increases, less time is taken for water to flow the length of a cavity. Less time exists for buoyancy to act.

The cavities generated on the upper and lower sides of hydrofoils are treated as individual cavities, each of which are formed on a rigid surface. Therefore, the overall combination of the two cavities is constrained from being buoyed upward. However, the shape of each cavity will deviate slightly from the no-gravity case because of the change in outside water pressure with depth, and may be calculated. As a consequence, the lower cavity will have slightly more curvature than the upper cavity.

The drag of a nose piece (or of any object which produces a cavity) is called cavity drag. If a cavity is designed to terminate smoothly on a wetted tail piece, then cavity drag is canceled by thrust acting on the tail piece. Otherwise, as in superventilating flow, cavity drag cannot be canceled. Cavity drag exists whenever cavity walls collapse at an angle to each other, away from underwater surfaces. When cavity walls meet at an angle 37, as shown in FIG. 12A, a forward-directed reentrant jet 31 is formed. The reentrant jet 31 falls under gravity and mixes with the on-coming water at the lower cavity wall 35, forming a large air-filled wake 33. FIGS. 12A, 12B, 12C and 12D conceptually illustrate the source of cavity drag, the reentrant jet 31 and frothy wake 33, and show how cavity drag is canceled.

Cavities are formed on both the upper and lower surfaces of a hydrofoil to reduce drag by the large factor needed to meet the requirements. It is therefore planned to form cavities by ejecting air behind a nose piece on both the upper and lower sides of a hydrofoil, and canceling cavity drag by smoothly closing each cavity with a wetted tail piece. The necessary lift is provided by the differential in pressure between the lower and upper cavities. The overall shape formed by the combination of a nose piece, two cavities and a tail piece is a streamlined surface which may be analyzed using fully-wetted hydrofoil theory. Since this streamlined surface is not a solid surface, but yet behaves like a solid surface, it is appropriate to call it a "virtual hydrofoil". To maximize structural strength, the underlying hydrofoil is designed to lie as close as possible to the cavity walls.

The nose piece can either be flat, wedge-shaped, or curved, as long as a downward step exists at the upper and lower ends of the nose piece to initiate the two cavities. That step can either be a permanent step through which air is injected, or a step which is formed only when air is injected. A wedge-shaped nose piece is preferred, and one which has a rounded leading edge. Other shapes may be used.

As shown in FIG. 13, the tail piece ideally consists of two "S-shaped" surfaces whose forward sections 39 are convex, and whose after sections 41 are concave. In this way, the elliptical cavities 25 can merge smoothly with the tail piece in the convex portion 39, and then the flow is redirected to the free-stream direction along the concave portion 41.

To minimize disturbances at the cavity walls, the velocity difference between the water and air along the wall is minimized. Consequently, the air is ejected behind the nose piece at water speed, and the cavity thickness is designed to maintain that air speed all along the cavity wall. Air flowing along the cavity at water speed forms an air boundary layer on the hydrofoil surfaces which thickens with distance. Consequently, the air gap between the hydrofoil surface and the cavity wall is such that the air boundary layer does not disturb the cavity wall. The air boundary layer is re-energized by sucking in the air boundary layer, and then pumping the air back out again at a higher velocity. To minimize air entrainment out of the cavities, the cavity air is sucked in by suction plenums 153, as shown in FIG. 3, just ahead of the cavity closure point and recycled by pumping it out behind the nose piece.

Another embodiment forms cavities by ignoring the water speed, and simply injecting enough air to maintain the cavities. That embodiment requires larger cavity thicknesses, but runs the risks of excessively either disturbing the cavity wall or increasing the air entrainment rate. Increasing the cavity thickness to the point where the air can freely recirculate within each cavity, the air is injected anywhere within each cavity. Conservatively, air is injected behind the nose piece at water velocity.

Changes occurring in operating variables such as speed, depth and angle of attack require controlling the upper and lower cavities to maintain near-constant lift and minimize drag. Control of the cavities is accomplished by controlling the nose and tail piece shapes, air flow rates, and air removal rates.

To maintain near-constant lift, the pressure difference between the upper and lower cavities is kept nearly constant. To do this when conditions change, the overall cavity shape must change. Any change in shape of the composite nose/cavity/tail "virtual hydrofoil" produces a change in lift coefficient which is predictable by fully-wetted hydrofoil theory. Drag is minimized by maintaining cavity length so the cavities continue to collapse smoothly on the tail piece.

In case the operating depth changes, the lift can remain nearly constant if the upper and lower cavity pressures are fixed relative to depth pressure. In case the depth changes along the span, such as when banking in turns, or when operating in large waves, then fences are placed along the span to separate the cavities into sections which are independently controlled as a function of depth.

It is necessary to control cavity shape as a function of speed to maintain near-constant lift. If lift is to remain independent of speed, then the lift coefficient, Cl, must increase when speed reduces. To increase Cl, the camber of the virtual hydrofoil (i.e., nose/cavity/tail shape) must increase. The simplest way to increase camber is to increase the thickness of the upper cavity while keeping the lower cavity unchanged. This change is accomplished by deflecting the upper part 43 of the nose piece 11 (i.e., a nose flap 43) outward to enlarge the upper cavity, as shown in FIG. 14. The tail piece is simultaneously modified to smoothly close the enlarged cavity.

A somewhat different change in cavity shape is needed when the angle of attack increases, such as by wave action. In order to maintain constant lift, it is necessary to introduce negative camber to counteract the lift otherwise generated by the positive angle of attack. That change is accomplished by thickening the lower cavity, while keeping the upper cavity the same. The lower cavity is thickened by deflecting the lower side of the nose piece outward. The tail piece is simultaneously deflected or modified to smoothly close the enlarged cavity.

The drag of struts 45 and hulls 4, as shown in FIG. 15, is reduced by generating air cavities on each side in a manner similar to that described above for hydrofoils. Controllable nose pieces 11 are used to generate cavities and to accommodate changes in speed, depth and yaw angle. It is possible to form either a single cavity 25 at atmospheric pressure, or multiple cavities 25 at different pressures, all the way down each side, as shown in FIG. 15. The preferred approach is to use cavities at atmospheric pressure.

Figure 20:
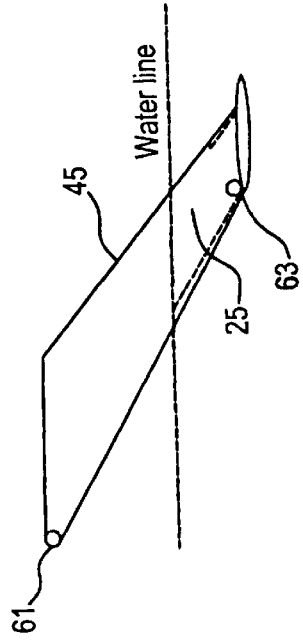
FIG. 20 is a side view of a strut.

Cavities are formed on the sides of either struts 45 or hulls 4 to reduce frictional drag. By careful design, an air cavity 25 at atmospheric pressure is made to extend from the surface down, as shown in FIG. 20, for a hydrofoil strut.

In the case of hulls, the necessary lift is provided by a high-pressure cavity formed on along the bottom of the hull. The cavity pressure is close to depth pressure, and provides the necessary lift. The bottom cavity is separated from the side cavities by a fence or a wetted region. Similarly, in the case of struts, the side cavities are separated from the hydrofoil cavities by a fence or a wetted region. Immersing the lowermost portions of struts in the upper hydrofoil cavities results in a relatively small intersection drag at the hydrofoil.

Near the water surface, the cavity drag of a strut or hull section is less than the frictional drag of a tail piece. Tail pieces are not used on struts or hulls near the surface. At shallow depths, the nose pieces are therefore superventilated, and no other part of the strut or hull at these depth is designed to contact the water. At these depths, the cavities are very long, so the strut or hull cross sections are shaped like truncated ellipses. At the very surface, the truncation point approaches the nose of an elliptical-shaped cavity, so the strut or hull sections approach a parabola in shape.

On a strut or hull, a depth is eventually reached where the frictional drag of a tail piece is less than the cavity drag at that depth. A tail piece for a hydrofoil strut is often not needed until about midway down the wetted portion of the strut. At this depth, the strut cavity is closed by a tailpiece toward the end of the cavity.

If strut spray is found to be a problem, then a number of small, horizontal, vertically-spaced spray rails are attached to the nose pieces, and angled a few degrees downward. These spray rails serve to deflect spray sheets outward and downward, and are attached above and below the water surface.

The cavities 25 generated by the nose pieces 11 of struts 45 or hulls 4 are elliptical shaped at all depths. At shallow depths the strut 45 or hull 4 cross section is shaped like a truncated ellipse. The shape at the very surface is parabolic (i.e., the limiting case of an ellipse which is truncated at the nose). Below a certain depth, the cavities 25 are full ellipses smoothly closed by a tail piece 19, as shown in FIG. 16B.

Near the surface, the cavity is so long that the hull 4 or strut 45 is truncated 47 in the forward part of the cavity ellipse, as shown in FIG. 16A. The hull or strut truncation point migrates aft relative to the cavity as the depth increases. Eventually, a depth is reached below which the strut 45 cross-section is a full ellipse, with small nose 11 and tail pieces 19 attached, as shown in FIG. 16B. Beyond this depth, the thickness/chord ratio of the cavity increases linearly with depth.

At the shallower depths where the strut is truncated, the relationship between cavity length, strut thickness and strut chord "c" depends upon the truncation region.

Strut and hull cavities are controlled similar to hydrofoils when changes occur in speed, depth, angle of attack and angle of yaw 49, as shown in FIG. 17. The strut 45 or hull 4 nose 11 and tail 19 pieces are segmented vertically to provide local control over the cavities 25. Waves will induce a small yaw angle 49 which tends to wet one side of struts 45 and hulls 4 which produces a side force. To eliminate the wetting and reduce the side force, the nose flap 43 on that side is deflected outward. At depths where tail pieces are used, this outward deflection cambers the cross sections and cancels the sideforce which would otherwise be produced by the angle of yaw. The cavity length will not change if the correct flap angle is used. However, the tail piece 19 is changed in shape to accommodate the small change in cavity 25 slope at the tail in order to smoothly close the cavity. That concept is illustrated in FIG. 17. Using automatic control to control nose and tail piece geometry, a pressure sensor on each side of the nose piece 11 is used to sense the differential pressure caused by a yaw angle 49, and pitot tubes are mounted near the front of each side of the tail piece to sense cavity length.

Waves can also produce small changes in speed and depth pressure. These changes cause changes in Cavity Number, K, which changes cavity shape and length. Cavity Number is defined as $$K = \frac{P_{depth} - P_{cav}}{q},$$

where $P_{depth}$ is depth pressure, $P_{cav}$ is cavity pressure and q is the dynamic water pressure. If K increases, for example, then the nose piece flaps must deflect outward to increase cavity length. Small changes in K are acceptable without the need for control.

A large change in Cavity Numbers from the design values occur at takeoff. For example, if takeoff speed is half design speed, then K quadruples. Therefore, to properly handle takeoff, the nose flaps are designed for relatively large outward deflections. The tail pieces must accordingly be designed to change shape in order to smoothly close these thicker cavities.

Figure 24:
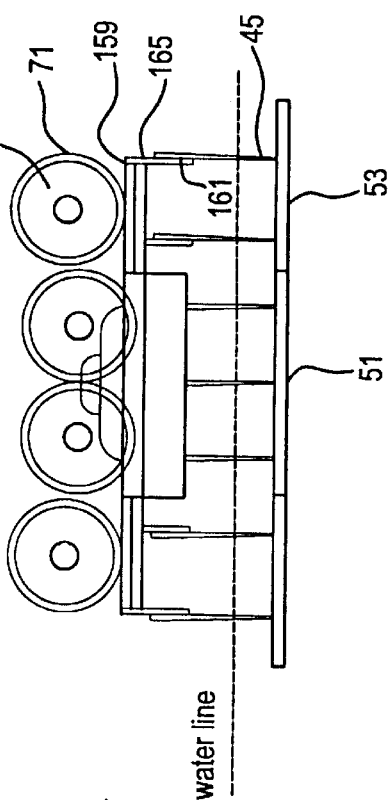
FIG. 24 is an overview of the hydrofoils showing spanwise fences.
Figure 25:
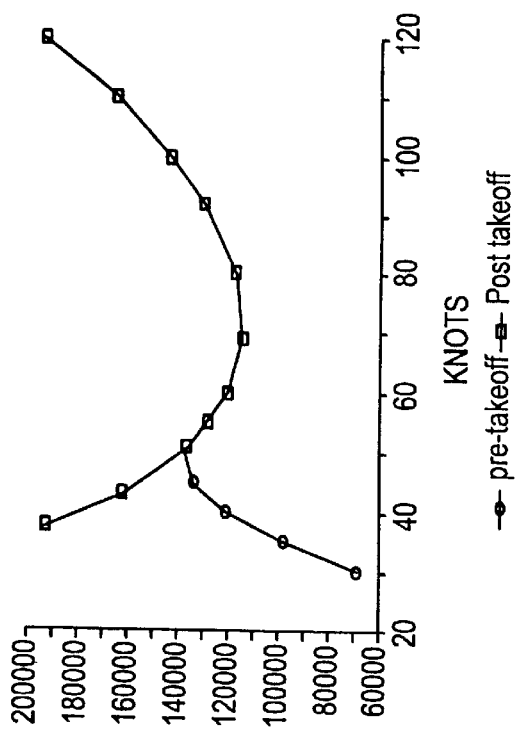
FIG. 25 is a close-up view of a water fence located between two cavities at different pressures.

When a monohull ship turns, the ship side-slips and heels outward; both results are undesirable. All low-drag ship concepts presented herein bank into turns so that no sideward acceleration is felt by passengers, much like an airliner. The maximum bank angle is limited by hydrofoil depth and span. However, an analysis shows that the bank angles are adequate, even in large waves. When banked, the differential pressure between the upper and lower cavities is slightly increased to generate the necessary additional lift. Because of the bank, the depth of the hydrofoil sections will be different from each other. That differential depth will produce differences in local cavity pressures. Fences are needed along the span to separate the cavities, and are illustrated in FIGS. 24 and 25. Different kinds of fences may be used, as described elsewhere in this patent.

The following are innovative features of cavity drag reduction. Frictional drag is reduced on hydrofoils, struts and bodies by covering surfaces with air cavities. The cavities are generated by short nose pieces, preferably wedge-shaped or cones-shaped. Short tail pieces are used to smoothly close the cavities, thereby canceling cavity drag. Air is ejected through slots located tangential to the ends of the nose pieces. Lift is generated by differential pressure between upper and lower cavities. Upper and lower cavities on submerged hulls are separated by horizontal fences. Air is optionally ejected into cavities at near-water-speed to minimize cavity wall disturbances. Air is optionally recirculated into cavities to minimize air entrainment rate and pressure drag. Air cavities are controlled by varying nose piece geometry, air flow rate and air pressure. Lift and sideforce are varied by differentially controlling the air cavity shapes on opposite sides. Drag is minimized by controlling tail piece geometry to smoothly close the cavities. Maneuvering is accomplished by banking into turns, and slightly increasing differential cavity lift. Thin, drag-reduced struts and hulls minimize wavemaking drag and vertical motion. Nose piece flaps are deflected outward at lower speeds to maintain cavity length.

A hydrofoil ship which uses a combination of advanced ideas was developed. Hydrofoil span, chord, thickness, planform shape, section shape, drag, depth, strut number, and lift coefficient were optimized. A scaled, 3-view drawing of a preferred embodiment of the low-drag, 100-knot, 10,000-ton hydrofoil ship is shown in FIGS. 18A, 18B and 18C.

Three hydrofoils are located adjacent to each other, forming a single, horizontal, vee-shaped hydrofoil which operates at a depth of 22 ft. The lead vee-shaped hydrofoil 51 has a span of 100 ft. The other two hydrofoils 53 are outboard and aft of the lead hydrofoil 51, and extend the overall span to 261 ft. Hydrofoil drag is reduced by around a factor of six by covering their surfaces with controllable air cavities. The hydrofoils 51, 53 are swept back 70.53 degrees to reduce wave effects by a factor of three. The 22-ft operating depth serves to further reduce wave effects by around a factor of two. Including air cavity control, the effects of waves can therefore be reduced by an order of magnitude or more. Consequently, both ship power and ship motion are reduced by about a factor of six or more.

At speed, the ship hull is supported 19 ft above the water surface by means of seven surface-piercing struts 45, three of which are attached to the forward hydrofoil 51, and two of which are attached to each aft hydrofoil 53. Both sides of the three hydrofoils 51, 53, and the seven struts 45, are covered with an air cavity 25 to reduce drag. Each of the upper and the lower cavity pressures may be the same on all hydrofoils. Therefore, the lift per unit area, and the lift coefficients, may be the same on all hydrofoils. Each hydrofoil 51, 53 is automatically controlled to maintain near-constant cavity pressure, and thereby provide near-constant lift in waves. The hydrofoils are linearly tapered in planform to provide a near-elliptical lift distribution to minimize induced drag.

A current preference is to propel the ship with four large, shrouded air propellers 55. Underwater propulsors are also acceptable, but require the addition of lengthy drive shafts or large underwater pods to house electric driving motors. Two shrouded propellers 55 are mounted outboard of the hull, and just ahead of the other two propulsors 55 which are positioned side-by-side at the stern.

The three hydrofoils and their support struts retract rearward and upward to reduce draft in harbors or shallow water, or to offload onto a beach. The ship version shown in FIGS. 18A through 18C will clear the Suez Canal, but not the Panama Canal. Another version, FIGS. 31A–D, is designed to clear the Panama canal by retracting and folding the hydrofoils. The ship maneuvers by banking into turns, much like an airliner, thereby eliminating sideward force felt by passengers. Emergency maneuvering is augmented by lowering drag brakes into the water on one or both sides of the ship, by reversing thrust, and/or by shutting off air to the cavities. The ship hull 4 is streamlined to minimize air drag.

The ship is designed for a draft of only ten feet to permit operation in shallow water. To offload onto beaches, the hydrofoils are retracted, and the ship is backed into shore after being reballasted bow down to raise the stern up to the surface. The payload is offloaded by means of four side-by-side, 20-ft-wide ramps which pivot down from the stern onto the beach. When loitering offshore, ship motion is reduced, as needed, by lowering horizontal damping plates and/or multiple air bags into the water.

Figure 19A:
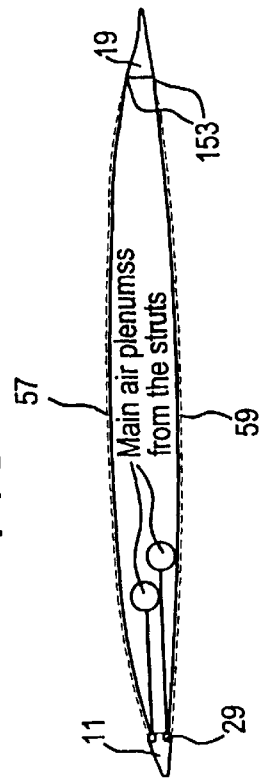
FIGS. 19A and 19B are cross-sections of a hydrofoil.
Figure 19B:
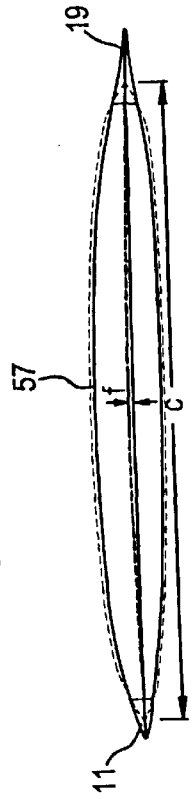

A hydrofoil 3 section is shown in FIGS. 19A and 19B. The cross section consists of a nose piece 11, upper 57 and lower 59 cavities, which lie just outside of the hydrofoil structure, and a tail piece 19. The outer surface of this assemblage forms a streamlined hydrofoil surface. The cross-sectional shape of the cavity-covered, constant-pressure region of the hydrofoil section approximates a cambered ellipse.

The nose piece is preferably wedge-shaped with a rounded tip, and the tail piece is preferably "S-shaped" on the upper and lower sides with convex forward sections and concave aft sections.

Cavitation is avoided by careful design of the nose and tail pieces, and by keeping the upper air cavity 57 filled with air at several psi above vapor pressure to provide a margin over cavitation. Cavitation is further avoided in waves by controlling cavity shape, and thereby cavity pressure.

If the spanwise hydrofoil lift is distributed elliptically, then the downwash angle due to lift is constant, and L/D is maximized. Also, if all hydrofoil sections are identical in shape, and if the hydrofoil is placed at the downwash angle of attack, then the lift generated at each spanwise section is the same as for a 2-dimensional section.

The drag caused by strut spray generated at the water surface is largely due to friction of the spray sheet on the strut surface lying above water. Since the above-water portion of the hydrofoil struts have a discontinuity at the ends of each nose piece, the spray sheet will separate and not contact the underlying strut surface. However, the portion of the spray drag caused by the upward momentum of the spray sheet will remain.

Several small fences are positioned vertically along the strut nose pieces to deflect the spray sheet outward and slightly downward in order to reduce spray drag and to keep the spray sheet from hitting the ship hull and other structure. The drag of these fences is small, and is expected to be about the same as their effect on reducing spray drag, so their drag is ignored.

The air drag of the ship hull is reduced by streamlining the hull shape, and by minimizing the hull cross-sectional area.

An air pump is needed to pump air from the atmosphere into higher-pressure air cavities, or to increase the velocity of air, such as when injecting air into a cavity behind a nose piece.

Cavity pressure on the upper surface of the hydrofoils is always significantly less than atmospheric pressure; therefore, no air pump is needed. The lower surface cavity pressure is around 1,000 psf above atmospheric pressure, while the upper surface cavity pressure is around 1,800 psf below atmospheric pressure. Therefore, if the air flow rates are about the same in each cavity, then it is possible to place air turbines in the ducts leading to the upper cavities which drive air pumps in the ducts supplying air to the lower cavities. The result is no net power required to supply the cavities.

The cavity pressure on the sides of the support struts is designed to be atmospheric and since pressure loss in the air ducts leading to the strut cavities is small, little or no air pump power is needed.

However, air pumps are needed to accelerate the air to water speed for injection into cavities, and to recycle air within cavities. If enough differential exists between the upper hydrofoil cavity pressure and the atmospheric pressure, then the power generated by the above-mentioned turbines is sufficient to also accelerate the air for injection.

Sweepback provides several advantages: the ability to provide pitch stability, the ability to control pitch, it greatly reduces the effect of waves on lift and it permits an increased hydrofoil thickness. However, even though thickness is increased, hydrofoil bending stress remains unaffected by sweep when cavitation is critical, as in the present invention. The primary disadvantage of sweep is that the structural weight of a hydrofoil increases, which is not a significant problem unless the hydrofoil-to-total-ship-weight is considered critical.

A sweptback hydrofoil placed at a given angle of attack generates less lift than an equivalent unswept hydrofoil placed at the same angle of attack. Similarly, a sweptback hydrofoil operating in waves will undergo much smaller lift changes than an unswept hydrofoil operating in the same waves. Any reduction in lift change translates into a proportional reduction in vertical acceleration, which improves ride quality.

A sweptback hydrofoil with a given camber ratio generates less lift than an unswept hydrofoil with the same camber ratio.

The minimum pressure on a sweptback hydrofoil caused by thickness and camber is less than for an unswept hydrofoil with same thickness and camber.

The theoretical effect of sweepback on frictional drag is not amenable to the sweepback analogy. Experimental data indicates that the frictional drag of a swept wing is about the same as an unswept wing; therefore, it is assumed that sweepback does not affect frictional drag. Note that sweep does not change the hydrofoil wetted area.

An initial stress analysis indicated that three struts are optimum for supporting the forward vee-shaped hydrofoil, and two struts are optimum for supporting each of the aft sweptback hydrofoils. Also, this initial analysis show ed that the hydrofoils may be hollow, which greatly reduces cost, and simplifies the installation and inspection of air ducts and control systems.

A preferable embodiment is a steel hydrofoil structure with a strength of 100,000 psi. Weight is reduced by reducing hydrofoil skin thickness in the nose and tail regions. Also, a large weight savings is made by optimizing skin thickness in the spanwise direction because the bending moment reverses from a maximum at each strut to an opposite moment of half that value at midspan, after passing through a region of zero moment located in between. However, weight is added for spars, ribs and other internal structure, which will somewhat reduce the savings by optimizing thickness. It is noted that sweepback does not change hydrofoil bending stress when cavitation is critical.

Struts provide greatly reduced drag because the majority of the underwater surface is covered with air. An air cavity is generated behind a nose piece. Down to a certain depth, no tail piece is used. Below that depth, the cavities are smoothly closed by a wetted tail piece. The strut cavities are filled with air at atmospheric pressure all of the way down to a short wetted region at the bottom of each strut. That wetted region acts like a fence to separate the strut cavities from the hydrofoil cavities.

When combined, the cavities on each side of a strut form an ellipse in cross section. The thickness/chord ratio of this overall cavity increases with depth. It is intended to initiate the strut cavities by a wedge-shaped nose piece. No tail piece is used to a certain depth because cavity drag is less than tail piece drag. Below that depth, the cavity is smoothly closed by a tail piece. The strut body is designed to lie just within the cavity wall.

At the surface, the cavity shape is parabolic. Just under the surface, the cavity shape is elliptical. At that depth, the cavity is so long that the ellipse is truncated near the nose. As the depth increases, the truncation point migrates aft until a depth is reached where the truncation point reaches the trailing edge, at which depth only a very small tail piece is needed to close the cavity.

The size of a strut depends primarily on structural requirements. The struts should taper in the downward direction because the bending moment due to any side load reduces as depth increases. After exploring various strut sizes, it was found that a thin, longer-chord strut, when covered with cavities, produces less drag than a thick, shorter-chord strut having the same bending strength. The primary reason is that cavity drag, tail piece thickness and tail piece length are all reduced.

The strut nose pieces are swept downward and rearward at about 60 degrees. A side view of the selected strut is shown in FIG. 20.

Strut thickness is determined by a tradeoff analysis based on hydrodynamics. The struts are hollow, so skin thickness is adjusted to satisfy structural requirements.

Spray drag is seen to be very small, but significant.

As shown in FIG. 20, the struts 45 are highly swept to reduce sideforce caused by waves. Strut thickness is a function of sweep angle, $\lambda$, and varies like $1/\cos\lambda$. The strut thickness is designed to also change with depth so that strut cavity drag down to a depth of around 13 feet is equal to the frictional drag of the tail pieces which are added below that depth. The struts retract rearward and upward by pivoting about their upper, forward corners 61. The hydrofoils retract with the struts, and pivot about the lower, forward corners 63 of the struts in such a way that they remain horizontal during retraction.

The three hydrofoils comprise a single vee-shaped hydrofoil which is swept back 70.53 degrees. Although the sweep angle is not critical, the use of this particular sweep angle reduces wave-induced effects by exactly a factor of three, and permits better control of the ship in pitch and heave without the use of additional hydrofoils. High-speed turns are made by banking the ship into turns.

It is desired to obtain an overall ship lift/drag ratio of at least 70. The direct and indirect variables which affect L/D ratio are sweep angle, lift coefficient, aspect ratio, operating depth, upper cavity pressure, number of struts, nose- and tail-piece sizes of hydrofoils and struts, strut thickness and chord, hull air drag, hydrofoil design stress, hydrofoil skin thickness, factor of safety on design stress, size of wetted fences at hydrofoil and strut tips, drag of any appendages, and propulsive efficiency.

To augment the powerful effects of sweep and depth in reducing the effects of waves, hydrofoil lift and strut sideforce are controlled by controlling cavity pressures and cavity thickness. To provide sensor information for control, pressure sensors are placed in the hydrofoil nose and tail pieces to detect the local angle of attack, speed, depth and cavity collapse point.

Figure 21A:
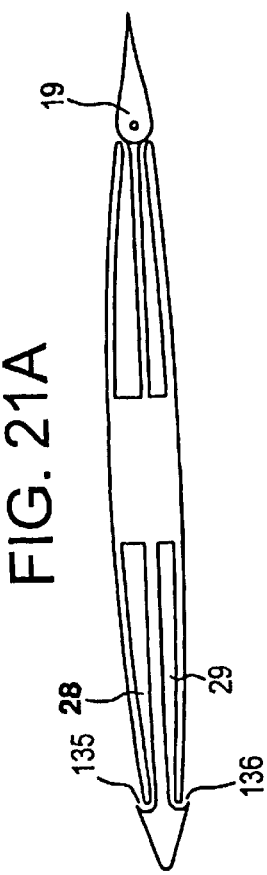
FIG. 21A is a cross-section of a hydrofoil illustrating a different design for the nose piece, plenums and tailpiece.

Also, to minimize cavity wall roughness and drag, it is desired to eject gas from a slot behind the nose piece of a foil in the direction of the water flow. However, if a foil is swept back, and gas is ejected rearward from a slot which parallels the foil leading edge, then the gas jet will move perpendicular to the leading edge, and not parallel to the water flow. A solution to this problem is shown in FIG. 21A wherein gas is ejected through slots 135 and 136 attached to plenums 28 and 29 wherein the plenums taper so that the gas velocity through the slot vectorially adds to the gas velocity in the plenum to provide a resultant gas velocity which parallels the outside water flow. For example, if a foil is swept back around 70 degrees, then the plenum velocity must be around three times greater than the perpendicular slot velocity so that the gas jet issues parallel to the outside water flow. In the case of no foil sweep back, guide vanes, or a porous material, may be placed between a plenum and a slot to straighten the gas flow before it leaves the slot.

Figure 21B:
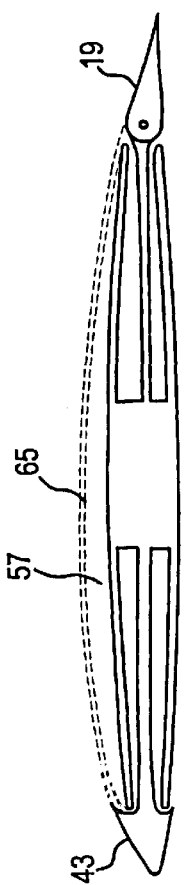
FIG. 21B illustrates changing the hydrofoil lift through control of air cavity thickness and tail piece geometry.

It is desired to keep lift constant from takeoff up to design speed. If takeoff occurs at less than half the design speed, then the lift coefficient is more than quadrupled. A high Cl is obtained by thickening the upper cavity 57 to increase camber. FIG. 21B illustrates how this is done while maintaining an air jet along the upper cavity wall 65. FIG. 21B also shows the change needed in tail piece 19 geometry to smoothly close the enlarged cavity 57.

At takeoff, the nose piece deflections are much larger than at design speed. At design speed, in waves, the camber might have to be reduced. The camber of the virtual hydrofoil is either increased or reduced by outward deflection of either the upper or lower nose piece flap. The maximum angle of attack change in 30-ft waves at 100 knots occurs for a 210-ft wave length, and is +/− 5.0 degrees at the surface, and +/− 2.6 degrees at a depth of 22 ft. Since the cosine of the sweep angle is ⅓, this maximum angle of attack change reduces to 0.87 degrees at the operating depth. That angle change is small, so lift should be relatively easy to control by controlling cavity shape. In fact, control may not be needed much of the time.

It is intended to control strut side force in a manner similar to that used to control hydrofoil lift. Since the struts are swept 60 degrees, the wave-induced angles of yaw are reduced by Cos(60), or ½. At a depth of 22 ft, the maximum wave-induced yaw angle is 1.3 degrees. At the surface, the maximum wave-induced angle is 2.5 degrees. These wave-induced angles for struts are larger than those induced on hydrofoils, because of the lower sweepback angle, but are still small considering that they relate to 30-ft waves.

Figure 22:
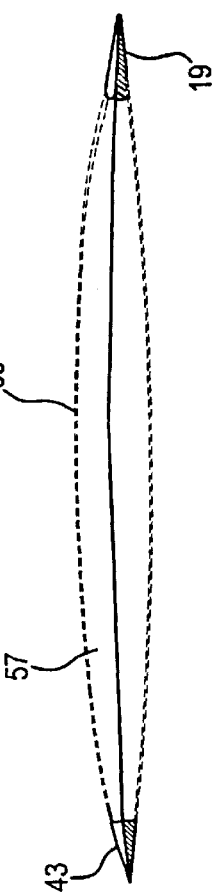
FIG. 22 is a strut cross-section illustrating changing the camber of a strut through deflection of the nose piece flap.

The local camber of a strut is changed as a function of yaw angle by an outward deflection of the nose piece flap 43 on the windward side, as shown in FIG. 22.

The change in camber produces a side force counteracting the lift produced by a yaw angle. Consequently, atmospheric pressure is maintained on each side of the strut at all depths without wetting the strut surface between the nose and tail pieces. Pressure sensors located in the nose and tail pieces can provide information on local cavity position, yaw angle, depth and speed. Since the distance between the nose and tail pieces is fixed, the cavity lengths are controlled to remain essentially unchanged.

Changes in either speed or depth will change the Cavity Number, K, because cavity pressure is fixed at atmospheric pressure. Changes in K produce changes in cavity shape. The nose piece flap angles are increased to generate the thicker cavities. Also, the tail pieces are simultaneously deflected to smoothly close the enlarged cavities. Small changes in K require no change in nose and tail shapes.

Just prior to takeoff, the ship weight is supported partly by buoyant hull lift and partly by dynamic hydrofoil lift. Just after takeoff, the hydrofoil provides all of the lift. A pre-takeoff analysis can provide the minimum power, and the corresponding ratio of buoyant lift to dynamic lift, as a function of speed prior to takeoff. A post-takeoff analysis can provide the minimum power required to operate the ship as a function of speed when supported only by hydrofoils. If power is graphed as a function of speed, the crossover point between the two curves is the maximum takeoff speed. The maximum power level on the post-takeoff curve provides the minimum takeoff speed. The difference between the minimum and maximum takeoff speeds is a measure of the power margin available for takeoff. If the pre-takeoff power curve never reaches the post-takeoff power curve, then the ship cannot take off.

Hull drag consists primarily of wavemaking and frictional drag. Wavemaking drag at critical speed for a given displacement varies roughly like $1/c^4$, where "c" is the hull length. Therefore, an increase in hull length by 19% would roughly cut wavemaking drag in half.

Various pre-takeoff speeds were studied to determine the optimum hydrofoil Cl and lift at each speed. The results are summarized in Table 1. For example, at 30 knots, the minimum power requirement is 69,771 shp when the hydrofoils support 1800 tons of ship weight with Cl=0.18. At 35 knots, the minimum power is 98,370 shp, and so on up to 50 knots where the minimum power is 137,979 shp.

Figure 23:
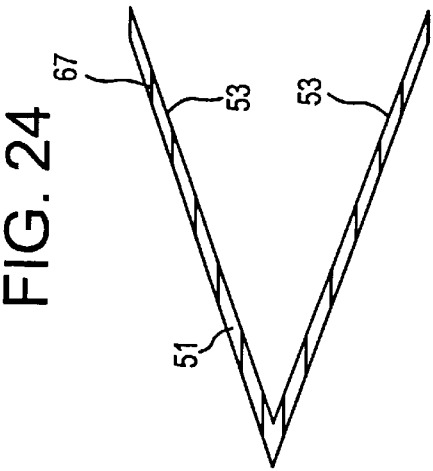
FIG. 23 is a plot of power required prior to takeoff and power required just after takeoff as a function of speed.

The power required just prior to takeoff, and the power required just after takeoff are plotted in FIG. 23 as a function of speed. In calculating the power required after takeoff, it was found that the lowest possible takeoff speed is 37.7 knots at the maximum power level of 193,000 shp, and where Cl=0.626. At the continuous power rating of 161,000 shp, the takeoff speed is 43.3 knots with Cl=0.470. At the cruise power level of 137,000 shp, the takeoff speed is 51.2 knots where Cl=0.340. However, to takeoff at a given speed, the ship must have enough power to reach that speed. The lower curve in FIG. 23 is the minimum power required to reach takeoff speed. The two curves cross at 50 knots where the power level is around 139,000 shp, and this is the maximum takeoff speed. FIG. 23 shows that takeoff can occur at any speed between 37.7 knots and 50 knots. The vertical distance between the two curves in this speed region represents the margin available in takeoff power. After takeoff, the minimum power is 116,000 shp at 68.4 knots, and the maximum speed is 119 knots.

The takeoff analysis also shows that the frictional drag, when using cavities for drag reduction, is less than 2% of the induced drag at the minimum takeoff speed of 37.7 kts. Frictional drag reduction is not critical at takeoff. It is necessary to use the air cavities to change the shape of the virtual hydrofoil sections, so the air cavities should be initiated around 35 knots for takeoff at the lowest possible speed.

The lift coefficient at the minimum takeoff speed is Cl=0.626. The upper air cavity is raised to provide the necessary camber. That increase in cavity height is achieved by increasing the upper nose flap angle. Another aspect of takeoff to explore is the ability to maintain cavities on the struts at speeds as low as 35 knots. At the lower depths, where the strut cavities at design speed are full ellipses, the cavity thickness is increased at 35 knots in order to maintain cavity length so the tail piece can close it. At the shallow depths, because of truncation, the strut cavities do not have to be thickened as much.

The ship is designed to maneuver by banking into turns. Banking is achieved by increasing the lift on one aft hydrofoil, and reducing the lift on the other aft hydrofoil. When banked, the pressure differential between all of the upper and lower hydrofoil cavities is increased to provide the necessary additional lift force. The maximum bank angle is limited by hydrofoil depth, and occurs when one hydrofoil tip nears the surface.

Because the hydrofoil and strut depths vary in a turn, and also vary when traversing through waves, it is considered necessary to add several spanwise fences along the hydrofoils and struts to permit different spanwise cavity pressure distributions. FIG. 24 is an overview of the three hydrofoils 51, 53 with spanwise fences 67 located at transverse intervals of 20 ft.

FIG. 25 shows a close-up section of a fence 67 on either a hydrofoil or a strut. A water fence 67, consisting of a narrow region of wetted surface, is used to separate any two cavities 25. The fence 67 is formed by placing a narrow gap between two adjacent gas ejection slots. Another embodiment is the induction of water at ram pressure and ejecting it outward from the surface through a slit located along fence 67, forming a curtain of water which acts like a fence 67. Another type of fence is a thin, wetted plate located along fence 67, and extending perpendicular to the hydrofoil surface.

For emergency turns and/or emergency stops, drag brakes are lowered on one or both sides of the ship. To slow the ship with a deceleration of 0.2 g, a reasonable maximum, the drag force is 2,000 lt. At 100 knots, two drag plates or two cones with a drag coefficient of 1.0 would each require an area of 157 sq ft. Circular drag plates would have a diameters of 14 feet.

One such plate or cone deployed on one side of ship, 50 ft off center, would provide a turning moment of 112,000,000 ft lbs, and a deceleration of 0.1 g. That moment is equivalent to a rudder side force of 448,000 lbs acting 250 ft aft of the center of gravity. A rudder side force coefficient of 0.25 gives an equivalent rudder area would be 63 sq ft. A larger plate, or the same plate angled to the flow, could provide a much larger turning moment in emergencies.

The ship maneuvers at low speed using rudders located inside the shrouds behind the propellers. Low speed maneuvering is augmented by two omnithrustors located near the bow of the hull. Those thrusters take in water from each side and eject it through angled vanes located in the hull bottom to produce a horizontal thrust in any direction. The vanes are swivelable through 360 degrees.

Either conventional diesel engines or gas turbines are employed for power generation. Diesels provide greater fuel economy, but are heavier than turbines. The selection is not considered critical because either type is feasible, and the selection requires a fairly detailed trade off study including fuel weight, propulsion system weight and propulsion system cost.

Figure 26:
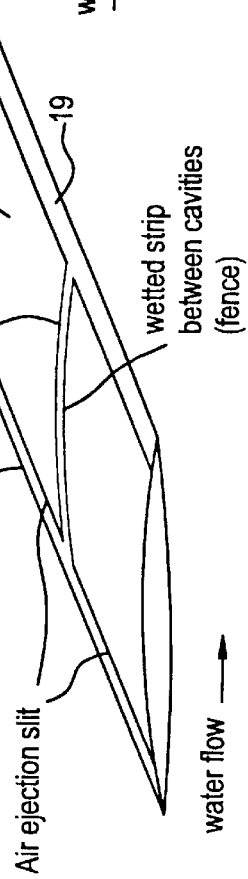
FIG. 26 is an end view of a low-drag, 100-knot hydrofoil ship equipped with four shrouded propellers.

A preferred propulsor, for a ship which does not have to pass through the Panama Canal, consists of four shrouded propellers 55, shown in FIG. 26, similar to those used for air cushion. Another preferred embodiment includes superventilated propellers, water jets and pumpjets. Those embodiments require either a very long drive shaft down through the struts and hydrofoils, or powering by means of either electric motors or hydraulic motors housed inside underwater pods. The pods for electric motors are very large. Hydraulic motors are housed in a smaller pod, but have low efficiency.

A shrouded air propeller propulsor is mechanically simple relative to underwater propulsors, and is driven by either a gas turbine mounted inside the shroud ring 71, or by a drive shaft running from either a diesel engine or a gas turbine located below the deck. An end view of the hydrofoil ship equipped with shrouded propellers 55 is shown in FIG. 26.

Figure 27:
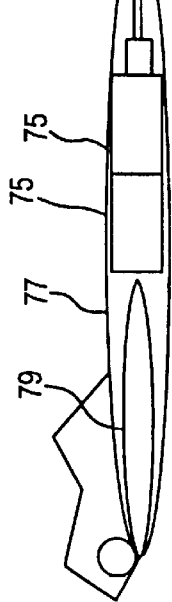
FIG. 27 is an illustration of a superventilating propeller driven by two electric motors in a pod attached to a hydrofoil.

Superventilated propellers have cambered wedge-shaped blade sections, and are in common use on high speed craft where conventional propellers would cavitate and lose efficiency. A superventilated propeller and a supercavitating propeller are similar in design if the Cavity Number is the same. The efficiency is a little lower than shrouded propellers, which is not serious. The main problem is how to deliver power to the superventilated propellers. If done electrically, the drive system efficiency is around 0.93 at best, as compared with 0.97 for a mechanical drive. Also, considerable drag is added drag due to the underwater pods which are needed to house the electric motors to drive the propellers. FIG. 27 illustrates a superventilated propeller 73 driven by a two electric motors 75 enclosed in a pod 77 attached to a hydrofoil 79.

Figure 28:
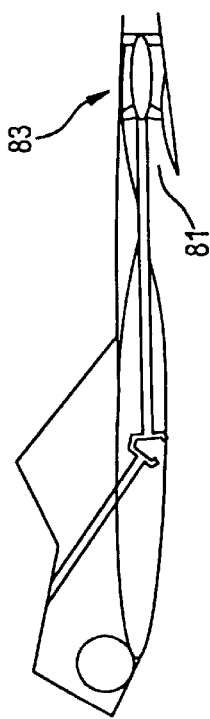
FIG. 28 illustrates a water-jet propulsion system.

Calculations show that an underwater shrouded propeller may be designed which will not cavitate at a speed of 100 knots if the shroud is designed to increase the pressure in the vicinity of the propeller. That type of propulsor is called a pumpjet 85, shown in FIG. 29. Cavitation is further eliminated by staging propellers, or by using a mixed-flow pump which is a cross between an axial-flow pump and a centrifugal pump. A water jet 83, shown in FIG. 28, is similar to a pumpjet in concept, except that the water enters the inlet 81 from one side instead of circumferentially. Although water jets 83 have become popular for use on high-speed ferries, a pumpjet 85 design is better suited for this hydrofoil ship because of better flow symmetry and a shorter duct. The efficiency is significantly higher than that of a superventilating propeller, and includes the drag of the shroud. A problem with pumpjets 85 applied to ships is that they do not reverse well, and they foul easier than a superventilating propeller.

Figure 29:
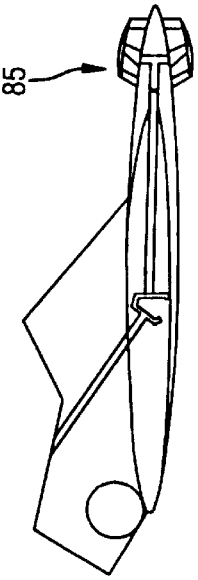
FIG. 29 illustrates a pumpjet system.
Figure 31C:
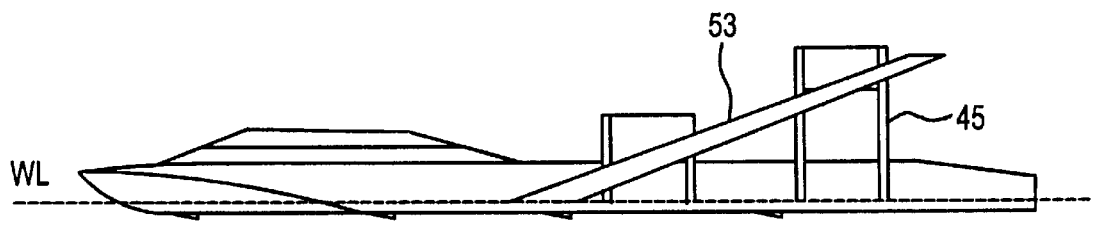
Figure 31D:
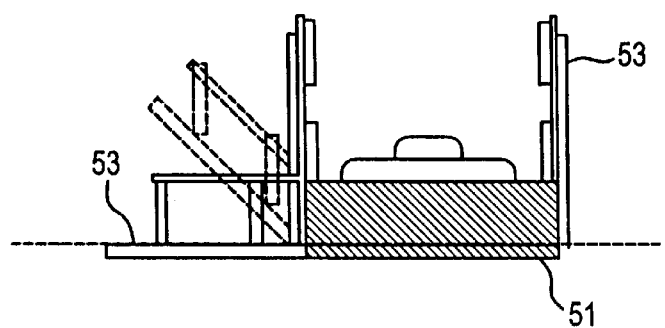

A water jet 83 propulsion system is illustrated in FIG. 28, and a pumpjet 85 system is shown in FIG. 29. In comparing the two types, it is apparent that the pumpjet system provides more-direct flow, and has less wetted surface area. The superventilated propeller 73 is shown driven by two electric motors, and the pumpjet 85 design is shown driven mechanically. Either propulsor could be driven by either system. It is apparent from FIGS. 27 and 29 that an electric drive would add considerable drag, even for pods drag-reduced by air cavities. Also, electric drives tend to be more complex than mechanical drives.

Figure 30:
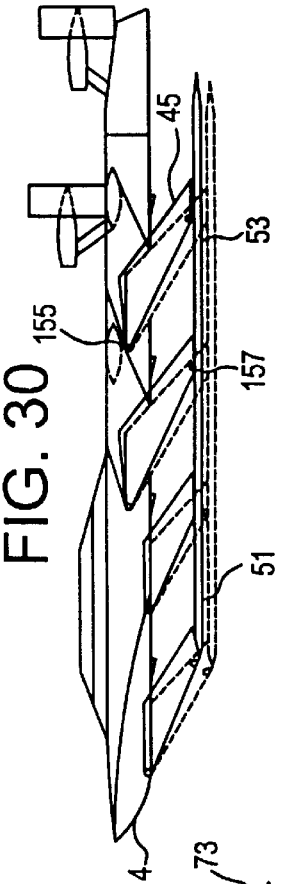
FIG. 30 illustrates an early hydrofoil retraction stage.
Figure 31A:
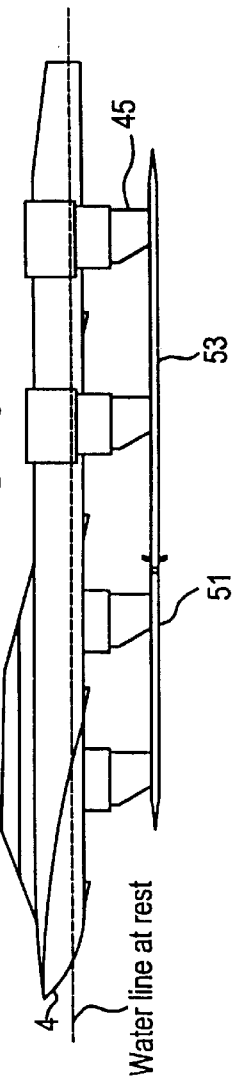
FIGS. 31A, 31B, 31C and 31D are side and end views illustrating the vertical retraction of the hydrofoil through the use of telescoping struts and linkages.
Figure 31B:
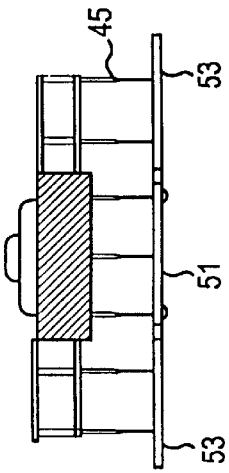

Retraction of the hydrofoils by pivoting the struts rearward and upward reduces draft to 10 feet. Pivoting the hydrofoils 51, 53 relative to the struts 45, to keep them horizontal as the struts retract, is shown in FIG. 30. That retraction system also permits the hydrofoils 51, 53 and struts 45 to retract automatically in case of a collision. The aft hydrofoils 53 retract to a position several feet above the at-rest water line. The forward hydrofoil 51 retracts to the bottom of the hull 4, or could be designed to retract into a shallow vee-shaped recession in the hull 4.

In case the hydrofoil ship must traverse the Panama canal, a preferred embodiment of retraction is illustrated in FIGS. 31A, 31B, 31C and 31D. The hydrofoils 51, 53 initially retract vertically by means of telescoping struts 45, and then fold by a parallelogram linkage against the sides of the ship. That version is shown with superventilating propellers, but could equally well have pumpjets.

Figure 32:
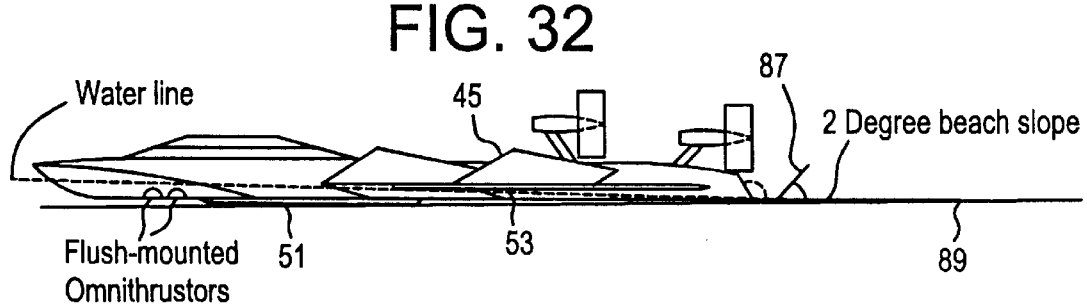
FIG. 32 illustrates offloading onto beaches for the ship in FIG. 30.

To offload onto beaches, four side-by-side ramps 87 lower from the stern after the ship is reballasted bow down about one degree to raise the stern to water level, and backed to shore 89 as shown in FIG. 32. The ramps 87 provide four independent offloading routes while firmly holding the ship against the shore 89. In case of extremely shallow beaches, or beaches with offshore shoals, floating bridges could be carried along and deployed for offloading troops and equipment.

Some requirements call for loitering offshore without significantly adversely affecting personnel readiness. Wave-induced ship accelerations should not exceed about 0.1 g, and ship pitch and roll should not exceed about 10 degrees. It is difficult to reduce either ship heave or ship pitch because of the large waterplane area. Roll is controlled by using internal anti-roll tanks, or by deploying air bags and/or underwater damping plates off to the side. Moving the ship forward at several knots with the hydrofoils down somewhat reduces motion.

Figure 33:
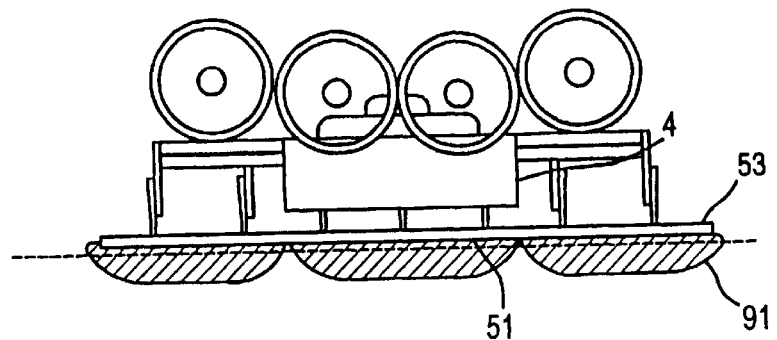
FIG. 33 illustrates motion reduction when loitering by employing air bags under each hydrofoil.
Figure 34:
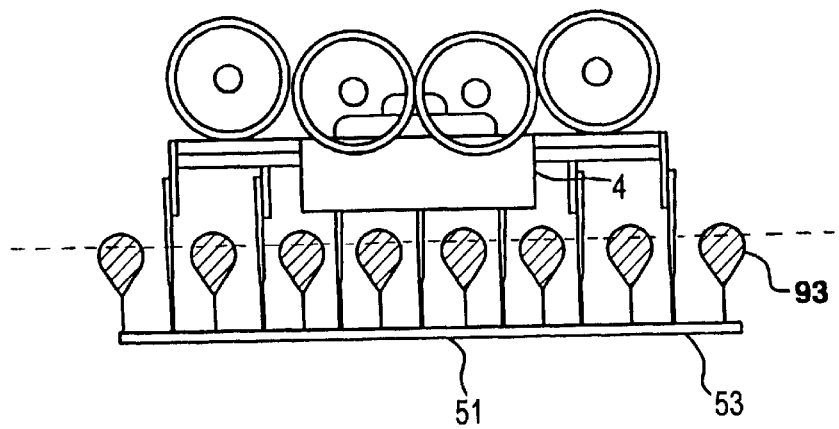
FIG. 34 illustrates motion reduction when loitering by employing air bags above each hydrofoil.

One way to greatly reduce motion when loitering is to deploy large air bags 92 under partially-retracted hydrofoils 51, 53 to raise the hull 4 out of water, as shown in FIG. 33. Another way is to leave the hydrofoils 51, 53 down and deploy air bags 93 above each hydrofoil, as shown in FIG. 34.

The following are the innovative features, either in combination or separately, of the low-drag, 100-knot hydrofoil ship. Three adjacent hydrofoils, in the shape of a vee, provide lift, pitch, roll stability and control. A 70-deg sweepback angle is used to reduce wave effects, and to increase hydrofoil thickness. Air cavities are formed on both sides of the hydrofoils and struts to greatly reduce drag. The cavity shape on each hydrofoil is independently changed to control ship heave, pitch and roll. The cavity shape on each strut is independently changed to minimize sideforce. The air cavities are controlled by varying air pressure, flow rate, and nose and tail geometry. Air is injected into the cavities at near-water-speed to minimize disturbances at the cavity walls. Air is optionally recirculated in the cavities to further reduce drag and power. A turbine in the air duct to the upper hydrofoil cavity powers a pump in the lower cavity air duct. A large overall hydrofoil span, and a low lift coefficient, are used to greatly reduce induced drag. The ship is preferably propelled by four shrouded air propellers. Maneuvering is accomplished by banking the ship into turns so no sideward acceleration is felt. Spanwise water fences are formed along hydrofoils and struts to separate air cavities. Drag plates are lowered into the water on one or both sides for emergency maneuvering. At lower speeds, nose piece flaps are angled outward to control cavity length. All hydrofoils are retractable, and in one ship version they also fold to lie within the hull beam. In case of collision, the hydrofoils automatically retract rearward and upward. Four ramps are deployed at the stern for offloading men and equipment onto unimproved beaches. Air bags or appendages are deployed when loitering to reduce wave-induced motion.

In the case of a ship without hydrofoils, a preferred embodiment of a ship hull is described which greatly reduces the drag and motion of ships. An air-filled cavity is generated behind a bow stem (nose piece) which covers both sides of the hull. Lift is generated by depth pressure acting on the hull bottom. The hull bottom is also covered by an air cavity to reduce frictional drag. The bottom cavity is separated from the side cavities by fences because of its greater pressure. Motion is reduced by minimizing lift changes by maintaining the bottom cavity at near-depth pressure. The hull is unlike any other craft. The hull has no front or rear air seal like an SES, the air cushions 91 are located far below the surface instead of on the surface, and the side walls are covered with air.

Figure 35A:
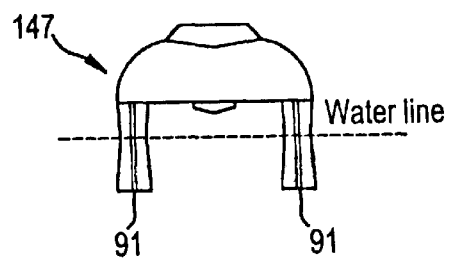
Figure 35B:
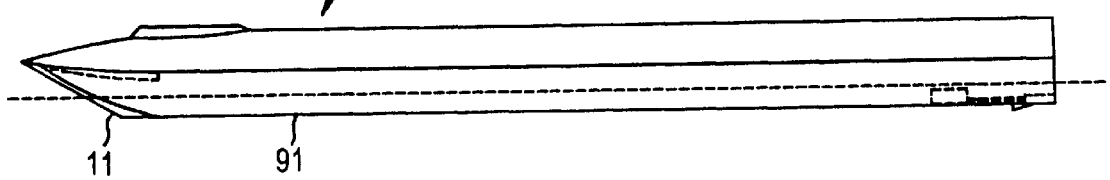

The geometry of the low-drag catamaran ship 147, shown in FIGS. 35A and 35B, depends partly on the design requirement constraints on depth, length and beam. One set of design requirements limit draft to 5 meters (16.4 ft), length to 600 ft, and overall beam to 106 ft for passage through the Panama Canal. To minimize drag, the maximum length and draft limits are selected, and a 100-ft beam is chosen because beam is not critical, and the ship might as well be designed to clear the Panama Canal. The next step is to design the underwater hulls.

It is intended to generate a single cavity, filled with atmospheric-pressure air, behind each bow stem. Each cavity is designed to extend from the surface to the bottom of each hull. Each hull is shaped to lie just inside of each cavity. At the surface, the hull cross section is shown in FIG. 35C; the cavity shape is theoretically parabolic in cross section. Just under the surface, the cavity shape is an ellipse which is almost infinitely long; therefore, the hull is truncated in the nose section of the cavity, so the hull shape is still theoretically very close to a parabola. As the depth increases, the cavity becomes shorter, and the hull truncation point moves rearward relative to the elliptical cavity. Eventually, a depth is reached where the cavity length is the same as the desired hull length, at which depth the hull truncation disappears. Below this depth, the hull shape is elliptical (except for small nose and tail pieces); however, most hull designs would not reach this depth, so the hull would always be truncated.

Each catamaran hull 4 lies inside an air cavity 167 bounded by the nose piece 11 and the bottom plate 91. Therefore, the lift and drag forces on the nose piece 11 and bottom plate 91 are essentially unaffected by the presence of the hull 4. Consequently, the hull 4 can be located anywhere within the cavity, or even above the water surface and supported by the nose piece 11 and/or one or more struts 163 attached to the plate, such as shown in FIGS. 35E, 35F and 35G. The struts 163 could have almost any cross-sectional shape since they do not normally contact the water, except at speeds below which a cavity forms.

The lift on the bottom plate 91 is primarily provided by depth pressure acting on the underside of the bottom plate. Air may be released along the underside of the bottom plate 91 to further reduce drag using means discussed elsewhere in this patent. However, the higher-pressure underside cavity must be separated from the lower-pressure cavity above the plate by means of fences comprising either small wetter plates, wetted regions of the bottom plate, water curtains, or some other such means. Also, drag may be somewhat further reduced by adding spray rails 165 to the surface-piercing nose piece 11, as shown in FIG. 35E.

Two or more of the nose-piece-and-bottom-plate combinations may be connected together, either above or below water. Also, that combination may even comprise an underwater vehicle in which the entire body of the vehicle lies underwater and within the cavity.

If a tail piece was added at any depth to close the water surfaces, then the frictional drag on the tail piece significantly exceeds the cavity drag. Therefore, tail pieces are not used on this drag-reduced catamaran ship, so the only surfaces in contact with the water are the nose pieces 11 and the fences at the bottom.

The bottom plate 91 of the hull, shown in FIG. 35D, is designed to be at depth pressure so that little or no dynamic lift is generated, and therefore, little or no induced drag is generated. Essentially, all lift is provided by buoyancy.

Different hull lengths, depths, shapes, and concepts effect L/D. FIGS. 35A, 35B, 35C and 35D illustrate a preferred embodiment which provides a lift/drag ratio of 70 with a draft of 16.4 ft. Its length is 750 feet for a 10,000-ton ship.

The results of an analysis showed that low-drag catamarans have L/D ratios much higher than conventional catamaran designs. A preferred embodiment which meets the requirement for L/D=70 is shown in FIGS. 35A–D. Its length exceeds the desired limit of 600 feet. Reducing hull length to 600 feet reduces the lift/drag ratio to L/D=50. Although still remarkably good, that L/D falls short of the goal. Interestingly, reducing speed to 90 knots, a catamaran hull length of 600 feet and a draft of 16.4 feet provides a lift/drag ratio of L/D=68, which meets the minimum design requirement.

Figure 36:
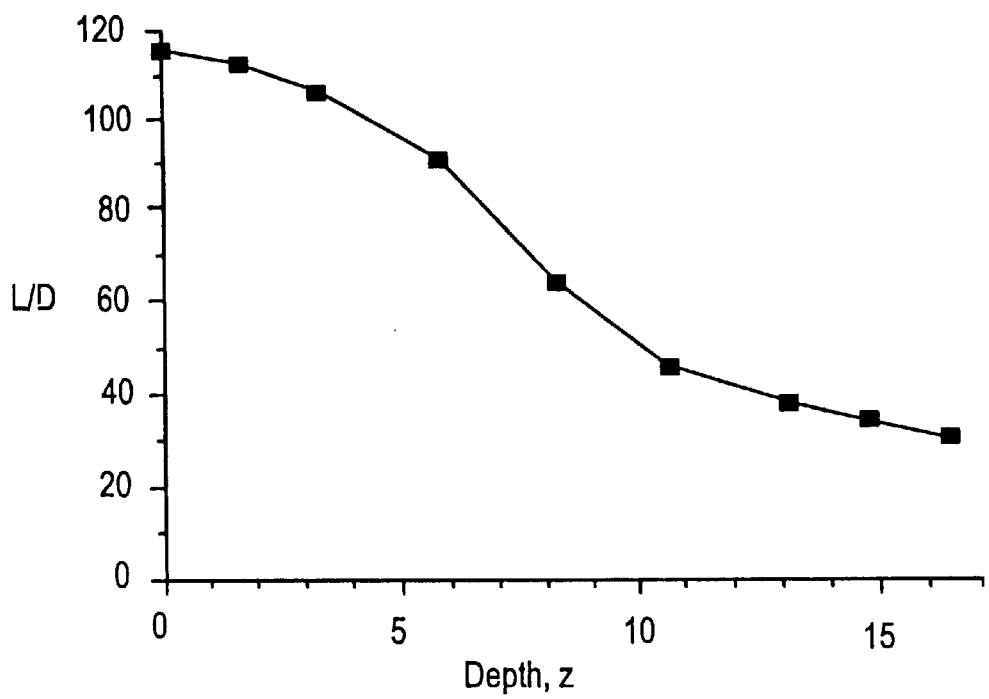
FIG. 36 is a plot of the L/D ratio versus depth for cross-sections of a 100-knot, 750 foot catamaran ship.
Figure 37:
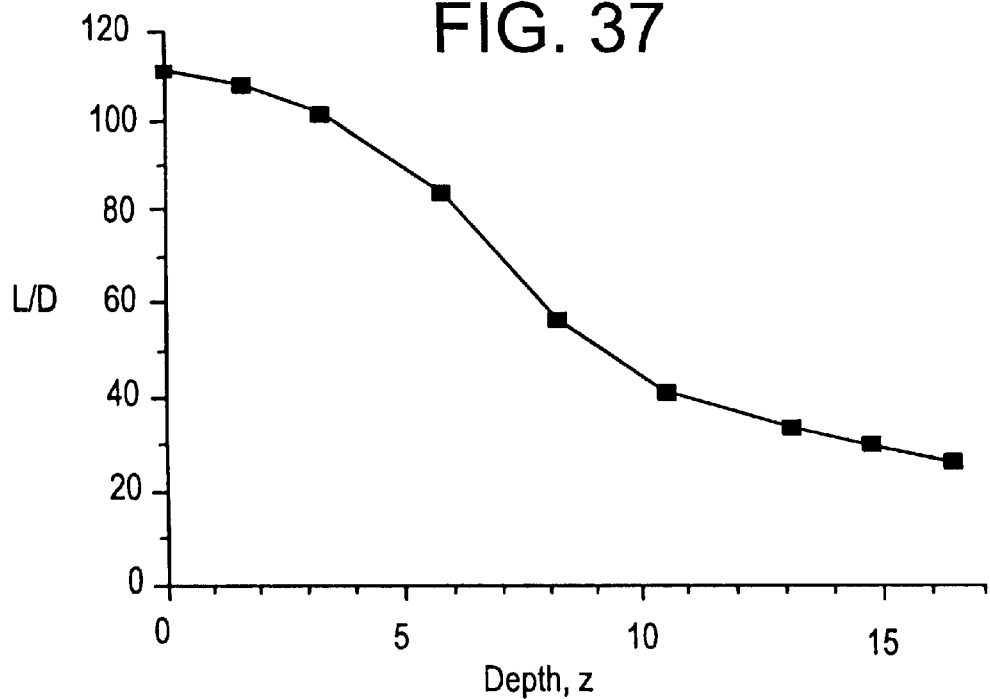
FIG. 37 is a plot of the L/D ratio versus depth for cross-sections of a 90-knot, 600-ft catamaran ship.
Figure 44C:
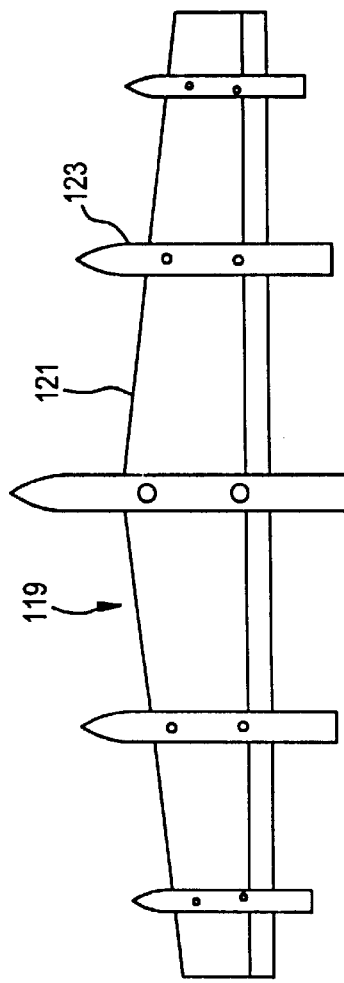
Figure 44D:
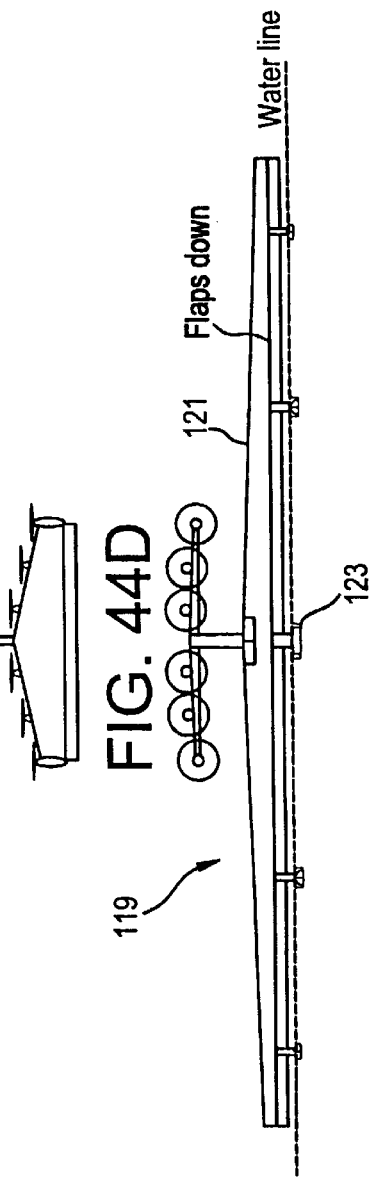
Figure 44E:
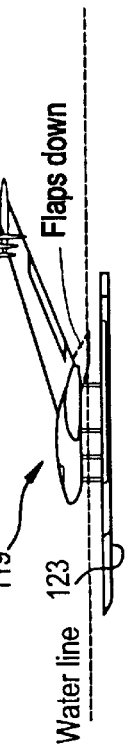

FIGS. 36 and 37 show the variation of local L/D with depth for a draft of 16.4 feet for the two design cases of a 100-knot, 750-foot version, and a 90-knot, 600-foot version, each having an L/D which satisfies the design requirements.

That analysis also showed that the length of the nose pieces for the 100-knot version varied from 6 feet at the surface to 30 feet at the hull bottoms, assuming a nose wedge half angle of 7.5 degrees and a sweep of 60 degrees. Nose wedge angles and nose piece lengths may be varied as long as the angle times the length is about constant.

Provisions are made for maintaining the air cavities above a certain speed, so that the installed engine power is not exceeded. Since the catamaran design is a displacement ship, its power when fully wetted increases roughly with the cube of the speed. At half speed, the power of a fully-wetted displacement hull is around ⅛ that at full speed. Since drag is reduced around a factor of six, the ship can reach a speed, when fully wetted, of around half the design speed before needing the air cavity control system.

At half speed, all Cavity Numbers, K, are increased by a factor of four. The thickness/length ratio, Tc/Lc, of the cavities at half speed are four times greater than at full speed. The nose piece wedge angle 93 is four times greater, so the wedge half angle must increase to 30 degrees to keep the cavities 25 clear of the hulls 4, as shown in FIG. 38.

To increase the wedge angle 93, a controllable flap 43, shown in FIG. 39, is employed for each side of the nose piece. An air injection slot integrated into each flap causes the air jet to deflect with the flap to maintain an air cavity wall speed equal to the water speed. That minimizes turbulence along the cavity wall 57. The cavities are started at speeds lower than half speed because the drag reduction system does not appear to be critical at half speed.

The next problem to address is the effect of waves on ship motion and on the cavities. With constant pressure on the hull bottom, any change in lift force is caused by changes in the vertical component of nose piece drag caused by waves, which is small. The principal problem is how to maintain near-constant pressure in the bottom cavity.

In long waves, whose length is much longer than the ship, the ship lift is controlled by controlling the bottom cavity pressure using air pumps and ejecting air continuously into the bottom cavity at water speed. In shorter, higher waves, the depth pressure will vary along the hull length. Although that pressure variation is much less than at the surface, it is still a significant problem. One solution is to locate secondary air injection slots along the length the hull bottoms such that air is automatically injected through any slot located in a region of the hull bottom which becomes wetted.

Roll and pitch are controlled by pop-out control fins located near the bottom of each hull. By further reducing motion, the passenger area, or main hull itself, may be motion-isolated from the side hulls, although this is not considered necessary.

Yaw or sway motion induced by waves is minimized by automatically controlling the outward deflection of the nose piece flaps on the side of the oncoming wave, as shown in FIG. 39. The maximum expected wave-induced yaw angle is 5 degrees at the surface in a 30-ft wave. The hull nose flaps are divided into vertical sections so that each section is controlled independent of the others. The nose flaps, if designed for operation at half speed, are large enough to prevent waves from hitting or wetting the sides of the hulls at design speed.

The ship is maneuvered by banking into turns. Banking is achieved by reducing the bottom pressure on the inward hull and/or increasing the bottom pressure on the outward hull. The pressure change is accompanied by movement of a horizontal bottom-mounted flap located near the nose of each hull bottom. To provide the necessary centripetal force in a uniform turn, a small increase in overall bottom pressure is generated. Drag plates are lowered into the water on one or both sides for emergency maneuvering.

Either two diesel engines or two gas turbines are positioned in the bottom of each hull, each driving a water jet. The four water jets would have retractable ram-scoop inlets. The water jet outlets are covered when backing into a beach for offloading. The propulsion efficiency of the water jets is similar to the shrouded air propellers designed for the hydrofoil ship, so the power requirement at L/D=70 will be the same, namely 137,000 shp.

Air bags located just under the surface are inflated to reduce motion when loitering, and for operating in shallow water, or very shallow harbors. For offloading directly onto a beach, the ship is reballasted bow down 2 degrees, and backed into shore, as shown in FIG. 40. The beach 89 slope is 3 degrees or greater. For shallower beaches, a portable floating bridge is carried along and deployed to offload the men and equipment. For offloading, a permanent ramp 95 is designed inside each hull leading from the main deck to the offloading ramp. Those internal ramps are positioned above the engines and water jets.

The following are the innovative features of the low-drag, 100-knot catamaran ship. Drag is greatly reduced by air cavities which cover the hull side and bottom surfaces. The only parts of the ship in contact with the water are nose flaps and bottom fences. The catamaran hulls are very thin to minimize cavity, wavemaking and spray drag. Hull lift is provided by bottom cavities at near-depth pressure. Air is ejected at near-water speed to form air layers on the hull sides and bottoms. Air is recirculated in the bottom cavities to minimize air pump power and drag. The bottom air cavities are controlled by varying air pressure and bottom nose flap angles. Sideforce in waves is controlled by controlling the outward deflection of nose flaps. The hull sides are kept dry at lower speeds by deflecting nose flaps outward on each side. Maneuvering is accomplished by banking into turns such that no sideward acceleration is felt. To offload, the ship is ballasted nose down, backed onto a beach, and ramps lowered. An offloading option is to carry and deploy portable floating bridges to a beach. Air bags are optionally inflated when loitering, offloading or in harbors to buoy up the ship. Drag plates are lowered into the water on one or both sides for emergency maneuvering. Small fins pop out underwater to control heave, pitch and roll as needed. The ship is propelled by two contra-rotating, superventilating propellers.

Another application of the air-cavity drag-reduction concept is to reduce the drag of SWATH ships. To minimize strut size and its associated drag, strut static stability is sacrificed. As a consequence, the lower hulls are sized to provide static stability at low speeds when awash at the surface. Also, when awash, draft is greatly reduced, permitting access to more harbors, to shallower water regions, and to permit offloading onto a beach from shallower water.

The lower hulls have a high length/diameter ratio in order to minimize draft at rest and to provide the necessary longitudinal static stability at low speed. Hull shapes operating at 100 knots at design depth indicated that hulls surrounded by air cavities have relatively low length/diameter ratios. Those two analyses generated conflicting objectives. That problem was solved by designing each lower hull to consist of tandem cavity-shaped bodies, joined end to end. The resulting configuration, a SWATH ship 149 shown in FIGS. 41A, 41B and 41C, provides four well-spaced waterplane areas when awash, minimizes draft, and satisfies the cavity-shape constraints when operating at design depth at design speed.

SWATH ship drag consists of the summation of the drag created by the following components: hull friction, fences, struts, wavemaking, air pump and air.

The struts 45 are similar to those for hydrofoil ships. The upper regions of the struts are superventilated by air at atmospheric pressure. The lower strut regions have tail pieces 19, and also fences 98 to isolate the strut side cavities filled with atmospheric air from the upper cavities 99 of the lower hulls.

The horizontal fence 97 on the lower hulls 107 not only separates the two cavities 99, 101, but eliminates the usual upsweep observed in single cavities caused by gravity. Gravitational effects occur within the upper and lower cavities because the local Cavity Number, K, increases with depth. Also, at the horizontal fence 97, K is greater on the upper side 103 than on the lower side 105 because the cavity pressure is less. More of the fence 97 is wetted on the lower side 105 than on the upper side 103. Those effects are not serious, but they do affect, the design shapes of the upper and lower halves of the hulls 107, and increase the fence wetted surface area.

The greatest effect of gravity, however, occurs at partial speed. Because of high wetted friction drag, cavity drag reduction is needed beginning around half design speed. At half speed, the Cavity Number is four times the value at design speed, so the diameter/length ratios of the cavities are quadrupled. The primary resulting problem is that, to retain cavity lengths, the diameters of the cavities become so large that they intersect the ocean surface.

A solution is to form four cavities 109, instead of one, on each part of the lower hulls, as shown in FIG. 42A. Because of the larger cavities, the horizontal fences are extended outward at reduced speed, and some negative dynamic lift is generated to counteract the added cavity buoyancy. The negative dynamic lift is generated by a small negative angle of attack.

At speeds up to design speed, the four cavities on each half section are made progressively less thick to accommodate the reductions in Cavity Number. When reaching around three-quarters design speed, alternate air ejection slots are closed, leaving only two cavities 111 to cover each part of the hulls, as shown in FIG. 42B. Finally, at speeds approaching design speed, air is ejected only at the front of each hull portion. Independent of either the number of cavities or speed, the cavity pressures are controlled to maintain constant lift.

Waves can cause normally-dry portions of the hulls to be wetted. Sensors are used to activate any or all of the three additional air injection slots, in order to reduce wetted area. In beam waves, surface wetting is reduced by selectively opening those portions of the injection slots located on the upwave side. The controllable flaps associated with each air injection slot, together with air pressure control, provide control of the local cavity shape.

The hull lift and pitch are controlled by controlling cavity pressures. Dynamic stability is provided by fully-wetted stabilizing fins. Preferably, the stabilizing fins are rigidly attached. In an alternative embodiment, the fins are controllable to help control heave and pitch.

Sideward acceleration is primarily controlled by adjusting the pressure differential across the struts in the lower region where fences are used to isolate the lower strut cavity pressures from the upper strut cavities which are at atmospheric pressure.

The ship is designed to bank into turns for maneuvering, similar to the hydrofoil ship. Banking is achieved by controlling the upper and lower cavity pressures on each lower hull.

It is intended to install two gas turbines or diesel engines in each lower hull, each driving either a counter-rotating superventilating propeller, or one superventilating propeller with pre-swirl fins located ahead of the propeller. If enough air escapes from the hull cavities, then the propeller blades will superventilate. Otherwise, air is pumped down to the blades from the atmosphere, which requires additional power.

When loitering, various options exist for reducing motion. Preferably, the struts are retracted with the hulls awash to provide both static stability and motion reduction. Another embodiment is to deploy air-filled bags to increase motion damping and increase static stability.

Alternatively, the hulls are left at normal operating depth and one or more air-filled bags are lowered into the water near each corner of the ship to provide the necessary static stability in pitch and roll. The submerged hull provides considerable motion damping. The waterplane is made small to minimize motion in waves.

The preferred method for offloading onto a beach is shown in FIGS. 43A, 43B and 43C. The cargo to be offloaded is placed in a self-powered cargo module 117 carried on the main deck. To offload, the struts are fully retracted with the hulls awash, and the cargo module is moved aft- As the module 117 moves aft, the center of gravity shifts rearward. When the transom of the upper hull contacts the water, the ship will have a bow-up trim of around 2.8 degrees. As the module 117 continues to move rearward, its stern will eventually contact the water surface, and buoyancy will begin to support part of its weight. When the module 117 is almost clear of the ship, the ship is further ballasted down at the stern until the stern is deep enough to permit the cargo module to float away. The cargo module 117 is then turned around and powered to the beach 89. When near the beach 89, the module 117 is trimmed bow up about 1.2 degrees, and beached. The bow ramps are then lowered, and the men and equipment are offloaded onto the beach. The procedure is reversed to bring the module back aboard the SWATH ship.

The following are the innovative features of the low-drag, 100-knot SWATH ship concept. The SWATH configuration provides low motion in waves due to a small waterplane area. Drag is reduced by air cavities which cover the majority of the hull and strut surfaces. Hull lift is provided by differential pressure between upper and lower cavities separated by fences. Strut static stability is sacrificed to minimize strut frictional and wavemaking drag. An inboard fin is attached to the aft end of each lower hull to provide dynamic stability in pitch. Long, slender lower hulls minimize hull wavemaking drag. Drag plates are lowered into the water on one or both sides for emergency maneuvering. The ship is propelled by two contra-rotating, superventilating propellers. Air is ejected at near-water-speed to form the air cavities along hull and strut surfaces. Air is optionally recirculated in the cavities to reduce drag and power. Air cavities are controlled by varying air pressure, and nose and tail piece geometry. Maneuvering is accomplished by banking into turns such that no sideward acceleration is felt. Draft is minimized at low speeds by designing the lower hulls to be awash. Air bags are lowered into the water when loitering to provide static stability.

A WIG (Wing In Ground effect craft) was developed specifically to satisfy the design requirements. A drawing of this 250-knot, 10,000-ton, 10,000-mile-range WIG is shown in FIGS. 44A, 44B, 44C, 44D and 44E. The WIG 119 has a shape and characteristics unlike any other aircraft.

The greatest problem in designing giant aircraft, such as the WIG, is excessive structural weight caused by large wing loads. Aircraft are limited in size by structural weight because lift increases like the square of length, while weight increases more like the cube of length. Another serious problem with huge aircraft is the lack of sufficiently-large landing fields.

Those problems and more are solved by the present invention. To greatly reduce the bending moment on the wing 121, when in flight, all cargo is carried within the wing. By distributing the load to match the lift distribution, large wing bending moments are avoided when in flight. Sudden local lift variations along the wing will still produce significant local bending moments, but those are small compared with the large wing bending moments generated when cargo is carried inside a fuselage.

The landing field problem goes away, because takeoffs and landing occur only on the water.

However, another serious problem arises, and that is the large bending moments on the wing caused by waves when at rest on the water, or when taking off. That problem increases with the wave height. A solution to this problem is to support the wing by five pontoons 123 which are attached below the wing so that they are able to move vertically relative to the wing. By appropriately controlling the load transmitted from the pontoons 123 to the wing 121, such as by springs, air cylinders, and/or hydraulic cylinders, the wing forces and motions in waves are greatly reduced. The pontoons 123 are able to move vertically through a range nearly equal to the height of the largest waves, or in this case, +/− 15 feet from the equilibrium position. After takeoff, the pontoons are retracted up to the wing where their air drag is minimized, and water clearance is maximized when flying in the ground effect of the ocean.

Incorporating those ideas, offloading onto a beach 89 is rather simple. The WIG 119 is taxied close to the beach, rotated 90 degrees, and tilted sideways until one wing tip 125 rests firmly on the beach 89. The wing tip 125 is then pivoted down to act as a ramp, and the payload is offloaded as shown in FIG. 45.

Flight speed is 250 knots when in ground effect. The WIG can fly out of ground effect to clear obstacles or bypass canals if provided with extra power. Takeoff speed is 106 knots. Water drag on the pontoons prior to takeoff is a problem. The water drag has to be lowered, in which case, some of the preferred embodiments mentioned elsewhere in this patent are used to reduce drag.

If a wing is designed to operate at 250 knots in ground effect, then it is equipped with a high-lift means to take off from the water. Both the in-flight case and the takeoff case are studied to optimize a wing. For takeoff, maximum values of lift coefficient are around Cl=3.5 with flaps and leading edge slots, and up to 6.8 for a jet flap. If a conventional high-lift flap is used for takeoff, together with wing leading edge slots, then a value of Cl=3.3 for maximum lift coefficient appears reasonable and somewhat conservative.

Wing structural weight is affected by the aerodynamic design, and vice versa. The most critical wing bending stress occurs when the WIG is at rest or moving slowly in large waves, and not when in the air or in the later stages of takeoff when the wing provides most of the lift. Since the pontoons support the full wing weight when at rest, the greatest wing bending moments occur at the pontoons. Because of shock mounting, the impact loads transmitted from the pontoons to the wing are relatively low. The displacement and spacing of the pontoons has been adjusted so that roughly the same maximum bending moment occurs at each pontoon, assuming that the structural weight of the wing, its fuel and cargo are distributed uniformly over the area of the wing.

A WIG can not only satisfy the design requirements, but exceed them in speed and range. The 250-knot speed is attractive since 10,000 nmi may be traveled in 1.67 days.

The wing size and thickness were designed to carry two rows of tanks and other large military vehicles, in addition to adjacent rows of smaller vehicles and equipment. It is possible to offload all rows of vehicles simultaneously.

If range is not critical, and for short distances, the WIG can fly as high as its installed power permits. Since cruise power is around 85% of continuous power, and if maximum power is 200 greater than continuous, then the installed power is 41% greater than cruise power, so the WIG could fly at a height of 90 ft with its installed power. To clear small obstacles of even greater height with the installed power, craft momentum is used. If a sustained height of 90 ft is not sufficient to clear a canal or land mass, a booster engine, or more power may be installed. If sustained unlimited flying height is desired, the installed power is increased 137%.

When at rest in the water, or moving slowly, the pontoons are designed to independently move vertically relative to the wing. Although pontoon motion might be large in waves, relatively little force change is transferred to the wing. Also, the pontoons have a depth of ten feet, and a draft of eight feet. Portions of the pontoons will be submerged in the higher waves either when at rest or when taking off, thereby reducing their loads.

When in flight, wind gusts will add to, or subtract from, WIG speed depending upon the gust direction. The usual upper-air wind turbulence flattens out near the surface, so wind gusts are expected to be relatively small, except perhaps near an island where wind can produce large vortices downwind of the island. Vertical air motion generated by waves is probably the largest cause of changes in wing angle of attack, loading and motion.

The following are the innovative features of the 250-knot WIG. Wing structural weight in flight is minimized by carrying all loads within the wing. WIG vertical acceleration in flight is also minimized by carrying all loads within the wing. The WIG is supported on the water by pontoons which are free to move vertically. Wing structural weight prior to takeoff is minimized by controlling vertical pontoon motion. Vertical acceleration prior to takeoff is minimized by controlling vertical pontoon motion. Pontoon heights are only 10 ft high, and are retracted in flight, maximizing wave clearance. Pontoon drag and motion are minimized during takeoff due to their low beams and heights. Pontoon drag is optionally reduced by air cavities which cover the pontoons. Pontoon drafts are only 8 ft, so the WIG can loiter or land in shallow water. Maneuvering in flight requires either flat turns, or rising in height before banking. Obstacles are avoided by flying over them. Men and equipment are carried in the wing, and offloaded onto beaches through a wing tip.

The airship 127, illustrated in FIGS. 46A and 46B, satisfies the vehicle requirements when built with a reasonable structural weight ratio. That vehicle has a length of 2691 ft and a beam of 384 feet. The airship in FIG. 46 has a range of 10,000 nmi at 143 knots, assuming a 20- fuel fraction. Also, it is assumed that a payload of 2,000 it may be carried with an overall displacement of 7,000 it. The required power is 139,000 shp, assuming a propulsive efficiency of 0.85, transmission efficiency of 0.97, and specific fuel consumption of 0.35 lb/shphr. The drag due to overvelocity on the hull and pressure drag is estimated to be 10.1%. The net airship drag is increased 15% to account for the parasite drag of the passenger and payload modules, and its non-round cross section.

The airship 143 cross section shown in FIG. 46B is tear-drop shaped in order to place the skin in tension to minimize structural weight. The lift generated by the helium is transmitted from the airship skin to an internal keel (not shown) which is attached to the skin all along the bottom. That keel is a bridge-like truss structure designed to transmit the lifting force to the passenger and payload modules. Airship fuel is carried in tanks located in this truss, together with water ballast tanks.

Ballonettes are located in the same region, and are supported by the truss and the airship skin. Those ballonettes are fixed-volume, air-filled bags which are pressurized with air as fuel is burned to compensate for the reduction in fuel weight. To minimize the size of these ballonettes, water is occasionally scooped up from the ocean and stored in the ballast tanks. The ballonettes are then depressurized to maintain constant airship weight.

Offloading is accomplished without surface support by simply lowering the 600-ft-long, 2,000-ton, self-propelled payload module 129 down to the ocean surface 89, as shown in FIG. 47. Before releasing the module, 2,000(+) tons of water ballast (weight of the payload plus the module) is taken aboard the airship and placed into its ballast tanks. As the water is taken aboard, the payload module slowly descends into the water until its buoyancy supports its weight. The payload module is then released, and propels itself to the shore to unload. After unloading, the module returns to the airship and is raised back into position aboard the airship. Prior to raising the empty payload module, water ballast is released from the airship until the module is clear of the ocean.

In other embodiments, the payload module is similarly unloaded to an inland lake, a bay or large river. The payload module is designed to offload onto a ship in order to keep the airship away from enemy action. Similarly, offloading could occur anywhere on land if water, or other kinds of ballast is available to replace the payload. Several individual payload modules are carried and lowered independently at different locations.

The airship is propelled by either conventional diesel engines or gas turbines, depending upon which, together with fuel, weighs the least. Diesel engines weigh more, but use less fuel. The tiny rectangular boxes shown in the propeller region of the airship are 35-ft long and 30-ft high. The propulsion system may be located in these areas. To minimize gear weight, each propeller may be outfitted with an epicyclic gear train powered by several pinions. A separate engine could power each pinion.

The following are the innovative features of this 143-knot airship. Airship structural weight is minimized by a teardrop cross section with the skin in tension. Water ballast is carried to augment ballonettes in compensating for weight changes. The payload is carried in a self-propelled module which is lowered into the water. Counter-rotating propellers are powered by epicyclic gear trains with engines in the hubs.

While the invention has been described with reference to specific embodiments, modifications and variations of the invention may be constructed without departing from the scope of the invention, which is defined in the following claims.

TABLE I

Pre-takeoff total power and hydrofoil lift

| knots | shp | lift (lt) | Cl |
|---|---|---|---|
| 30 | 69,771 | 1820 | .18 |
| 35 | 98,370 | 2752 | .20 |
| 40 | 121,167 | 3775 | .21 |
| 45 | 134,428 | 5005 | .22 |
| 50 | 137,979 | 6460 | .23 |

I claim:

1. A low drag flow apparatus for supporting a craft comprising a foil body submerged as a hydrofoil having a leading edge region and a trailing edge region, and having an upper surface and a lower surface and at least one source of gas connected to the foil body, the leading edge region further comprising a nose piece connected to the foil body and at least one source of gas connected to the foil body for releasing gas behind the nose piece along at least the upper surface of the foil, wherein the nose piece is angled and controllable with respect to the foil for releasing gas behind the nose piece ahead of the upper surface of the foil, and for controlling height of a gas cavity of released gas behind the nose piece for controlling thickness of the gas cavity along the upper surface between the nose piece and the trailing edge region.

2. A low drag flow apparatus for supporting a craft comprising a foil body having a leading edge region and a trailing edge region, and having an upper surface and a lower surface, a higher pressure source of gas, and a lower pressure source of gas connected to the foil body, the leading edge further comprising a nose piece connected to the foil body near the sources of gas for releasing gas behind the nose piece, wherein gas is released along upper and lower surfaces of the foil, wherein gas is released from the higher pressure source along the lower surface of the foil body, and wherein gas is released from the lower pressure source along the upper surface of the foil body for forming cavities between the nose piece and the trailing edge region on the upper and lower surfaces.

3. The apparatus of claim 1, wherein the gas is released as jets which approximately match local water flow speed and direction.

4. The apparatus of claim 2, wherein the nose piece is movable and controllable with respect to the foil for increasing the nose piece thickness ahead of one of the surfaces of the foil.

5. The apparatus of claim 4, wherein the nose piece is horizontally divided and wherein an upper portion of the nose piece is movable upward for increasing the nose piece thickness ahead of the upper surface of the foil.

6. The apparatus of claim 5, wherein the nose piece includes a movable lower portion which is movable downward for increasing the nose piece thickness ahead of the lower surface of the foil.

7. The apparatus of claim 6, wherein the surfaces of the upper and lower nose piece portions are substantially flat, angularly related surfaces.

8. The apparatus of claim 6, wherein the upper and lower surfaces of the nose piece portions are curved in cross section, and the nose piece leading edge is rounded.

9. The apparatus of claim 6, further comprising at least one air ejection slot attached to at least one of the upper and lower portions of the nose piece to generate a gas jet curtain which moves rearward from the nose piece portion when that nose piece portion moves outward from the foil.

10. The apparatus of claim 1, further comprising at least one gas intake along at least one surface of the foil near the trailing edge for withdrawing gas into the foil.

11. The apparatus of claim 2, further comprising gas intakes along the upper and lower surfaces of the foil near the trailing edge for withdrawing gas into the foil.

12. The apparatus of claim 11, further comprising pumps for withdrawing gas from the intakes and pressurizing the gas to return it to the sources of gas.

13. The apparatus of claim further comprising a tail piece at the trailing edge, and sources of reduced pressure connected to the tail piece for withdrawing gas through the tail piece, and means for changing the geometry of the tailpiece.

14. The apparatus of claim 13, wherein the trailing edge of the tail piece is pivoted downward to help increase foil lift, and is pivoted upward to help reduce foil lift.

15. The apparatus of claim 13, further comprising sensors along surfaces of the foil for sensing surface conditions, and controls using sensor information connected to the nose piece, gas jets, gas intakes and tail piece for controlling the nose piece geometry, the gas release from the gas jets, the gas intake rates and the tail piece geometry according to signals from the sensors.

16. The apparatus of claim 2, further comprising gas jets in surfaces of the foil for releasing gas along the surfaces of the foil.

17. The apparatus of claim 16, further comprising flaps hinged to the surfaces of the foil forward of the gas jets and extending over the gas jets for closing against the gas jets and for opening when gas is ejected through the gas jets.

18. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, wherein gas is released rearward along upper and lower surfaces of the foil, further comprising gas lets in surfaces of the foil for releasing gas along the surfaces of the foil, flaps hinged to the surfaces of the foil forward of the gas jets and extending over the gas jets for closing against the gas lets and for opening when gas is elected through the gas nets, further comprising at least one gas intake forward of at least one gas jet, the intake connected to a pump for withdrawing gas through the intake, for increasing its pressure, and for releasing it along the surface of the foil behind the intake.

19. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, further comprising at least one gas intake along at least one surface of the foil near the trailing edge for withdrawing gas into the foil, wherein at least one surface near the trailing edge is s-shaped and wherein two intakes are located near the forward end of the s-shape whereby gas is withdrawn through the first intake at higher speeds, and through the second intake at lower speeds.

20. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, wherein gas is released rearward along upper and lower surfaces of the foil, further comprising gas intakes along the upper and lower surfaces of the foil near the trailing edge for withdrawing gas into the foil, a tail piece at the trailing edge, and sources of reduced pressure connected to the tail piece for withdrawing gas through the tail piece, and means for changing the geometry of the tail piece and, sensors on the tail piece and means for adjusting the rates for gas release, and for withdrawing gas near the tail piece according to conditions sensed by the sensors.

21. The apparatus of claim 2, wherein the upper and lower foil surfaces are curved in cross section, and wherein the upper surface is more convexly curved than the lower surface.

22. The apparatus of claim 2, wherein the gas sources are attached to spanwise plenums which lie near the foil leading edge, and which contain slots through which the gas is released as jets moving rearward along the surfaces.

23. The apparatus of claim 22, wherein a flow-directing means is positioned between each plenum and each slot so that the gas jets issue nearly parallel to the water flow.

24. The apparatus of claim 1, wherein the foil is swept back.

25. The apparatus of claim 24, wherein spanwise suction plenums are positioned near the trailing edge, and taper outward toward plenum air removal points in the foil to keep the gas velocity in the suction plenums more uniform.

26. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, wherein gas is released rearward along upper and lower surfaces of the foil, wherein the gas sources are attached to spanwise plenums which lie near the foil leading edge, and which contain slots through which the gas is released as jets moving rearward along the surfaces, wherein the foil is swept back, and wherein the plenums taper along the foil from air supply points so that the gas velocities in the plenums vectorially combine with the gas velocities through the slots so the gas jets emerge about parallel to the local water flow and at about the local water velocity.

27. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, further comprising at least one gas intake along at least one surface of the foil near the trailing edge for withdrawing gas into the foil, wherein a strip of porous material is placed in the gas intakes.

28. The apparatus of claim 1, wherein the foil is a strut connecting an underwater surface to an above-water object wherein the upper surface is defined as one side of the strut, and the lower surface is defined as the other side of the strut, and the gas is air.

29. The apparatus of claim 28, wherein air is released from both side surfaces along at least a portion of the depth of the strut.

30. The apparatus of claim 28, wherein the nose piece is vertically divided into side portions which are segmented vertically wherein each nose piece segment is movable outward for increasing the local nose piece thickness on that side ahead of the strut surface.

31. The apparatus of claim 28, wherein the foil is swept back at an angle greater than 45 degrees.

32. A low drag flow apparatus for supporting a craft comprising a foil body having a leading edge and a trailing edge, and having an upper surface and a lower surface and at least one source of gas connected to the foil body, the leading edge further comprising a nose piece connected to at least one source of gas for releasing gas from the nose piece rearward along at least one surface of the foil, wherein the foil is a strut connecting an underwater surface to an above-water object wherein the upper surface is defined as one side of the strut, and the lower surface is defined as the other side of the strut, and the gas is air, further comprising an upper portion and a lower portion wherein at least the upper portion of the strut is superventilated behind the nose piece.

33. The apparatus of claim 32, wherein strut cross sections in superventilated region vary downward from the water surface from a thin parabolic, ellipse-like shape truncated near its leading edge, to thicker ellipse-like shapes which are cut off progressively closer toward their trailing edges as the depth increases.

34. The apparatus of claim 33, wherein a depth may be reached below which a tail piece and an associated air intake are included to smoothly close ellipse-like air cavities which increase in thickness-to-chord ratio as the depth further increases.

35. The apparatus of claim 34, wherein air is released from both side surfaces along at least a portion of the depth of the strut, and including horizontal fences to separate air cavities when cavity pressures are different from atmospheric pressure and from each other.

36. The apparatus of claim 1, wherein the foil is a hydrofoil and the gas is air.

37. The apparatus of claim 36, wherein the hydrofoil is swept back at an angle greater than 45 degrees.

38. The apparatus of claim 36, wherein streamwise fences are placed along the hydrofoil on at least one surface.

39. A hydrofoil vessel comprising an above-water hull, propulsion system, and struts having upper ends connected to the hull and having lower ends connected to a v-shaped hydrofoil in plan view wherein the hydrofoil has thin vertical dimensions and is swept back greater than 45 degrees, wherein the struts are movable and the hydrofoil lies nearly in a horizontal plane, and wherein the hydrofoil is divided into three hydrofoils comprising a v-shaped forward hydrofoil positioned under the hull and first and second aft hydrofoils extending outward from the hull, the aft hydrofoils forming rearward and outward extensions of the forward hydrofoil.

40. The apparatus of claim 39, wherein the struts lie in essentially vertical planes and comprise a forward strut and two laterally-spaced struts connected to the forward hydrofoil and outboard forward and aft struts connected to each aft hydrofoil.

41. The apparatus of claim 40, further comprising outward extensions connected between the hull and the outboard, forward and aft struts.

42. The apparatus of claim 41, further comprising turbofan engines mounted on the after outward extensions and on the hull for propelling the vessel.

43. The apparatus of claim 41, wherein the outboard struts are telescopable, and wherein the outward extensions form a parallelogram structure in front view which permits telescoped outboard hydrofoils to pivot vertically flat against the sides of the hull.

44. The apparatus of claim 40, wherein the struts are telescopable.

45. The apparatus of claim 39, wherein the struts are connected to the hull with upper horizontal pivots and wherein the struts are connected to the hydrofoils with lower horizontal pivots, wherein the hydrofoils may be drawn up to the hull by pivoting the struts for shallow water operations.

46. The apparatus of claim 45, wherein the upper pivots and the lower pivots are connected at leading portions of the struts.

47. The apparatus of claim 39, further comprising propulsion units mounted on at least one hydrofoil.

48. The apparatus of claim 39, wherein the hydrofoils have upper and lower surfaces and have leading and trailing edges and further comprise nose pieces along the leading edges for releasing gas along leading edges of the hydrofoils for flowing gas along surfaces of the hydrofoils.

49. The apparatus of claim 48, further comprising spaced wetted fences extending in the flow direction along the upper and lower surfaces of the hydrofoils for separating air cavities.

50. The apparatus of claim 48, wherein the gas is released at essentially the local water velocity and local water flow direction, wherein the struts comprise foil sections, wherein the hydrofoils and struts are mostly covered with gas, and wherein gas is removed from the hydrofoil surfaces near the trailing edges.

51. The apparatus of claim 39, wherein the vessel comprises a stern opening and ramps extendable from the stern opening for off loading and receiving personnel and cargo.

52. SWATH apparatus comprising a ship body, parallel buoyant torpedo-shaped hulls extending in fore and aft directions of the craft and fore and aft telescoping struts connecting the buoyant hulls to the body, the buoyant hulls having upper surfaces and lower surfaces and horizontal fences extending along the hulls between the upper surfaces and the lower surfaces, nose pieces on the forward end of the bodies and gas sources connected to the nose pieces for releasing lower-pressure gas from the nose pieces along the upper surfaces of the hulls, and for releasing higher-pressure gas from nose pieces along the lower surfaces of the hulls.

53. The apparatus of claim 52, wherein the hulls comprise forward sections and rearward sections and further comprising gas injection slots connected between the forward and rearward sections and connected to the sources of gas for ejecting gas rearward along upper and lower surfaces of the rearward section.

54. The apparatus of claim 53, further comprising gas inlets at the trailing ends of the hulls.

55. The apparatus of claim 52, further comprising gas inlets and gas jets mounted along upper and lower surfaces of the hull for withdrawing and injecting gas along the surfaces of the hull.

56. The apparatus of claim 55, further comprising sensors connected to the gas inlets and the gas ejectors for controlling the gas inlets and the gas ejectors according to conditions sensed on the surfaces of the hulls.

57. The apparatus of claim 56, further comprising propulsion systems mounted on aft ends of the hulls.

58. A low drag underwater body comprising a nose piece, a tail piece, and an upper surface and a lower surface positioned between these nose and tail pieces, wherein the nose piece is connected to a lower-pressure source of gas for releasing gas from the nose piece rearward along the upper surface of the body, and wherein the nose piece is connected to a higher-pressure source of gas for releasing gas along the lower surface, and also comprising horizontal fences which separate the upper and lower surfaces.

59. The apparatus of claim 58, wherein the gas is released as jets which about match the local water flow speeds and directions.

60. The apparatus of claim 58, wherein the nose piece is segmented wherein each segment is movable with respect to the body for increasing the local nose piece thickness ahead of the surfaces.

61. The apparatus of claim 58, further comprising intakes near the tail piece for withdrawing gas into the body.

62. The apparatus of claim 61, further comprising gas ejection and gas intakes lying between the nose and tail pieces.

63. A watercraft comprising a craft having a long transverse span above-water foil-shaped lifting body, struts extending downward from the lifting body, pontoons connected to the struts, gas sources connected to the pontoons, nose pieces mounted on the pontoons and connected to the gas sources for releasing gas rearwardly along surfaces of the pontoons for reducing drag on the pontoons.

64. The apparatus of claim 62, wherein the lifting body is a wing wherein a payload is carried essentially within the wing, and wherein the struts vary in height and retract.

65. A low-drag lifting apparatus comprising a strut-like nose piece which lies at least partly under water and an essentially-flat lifting bottom plate which is attached near a bottom of the nose piece, further comprising a gas-filled cavity that lies behind the nose piece and extends down to the bottom plate, also comprising a pressurized gas source wherein gas from this source is released along the underside of the bottom plate for reducing drag on the underside of the bottom plate.

66. The apparatus of claim 65, where the gas is air.

67. A low-drag lifting apparatus comprising a strut-like nose piece which lies at least partly under water and an essentially-flat bottom plate which is attached near the bottom of the nose piece wherein the trailing edge of the nose piece is essentially its thickest part, and wherein the region lying behind the submerged portion of the nose piece and above the bottom plate is at least partially filled with gas, an above-water structure attached to the bottom plate by at least one strut-like member, at least one other similar apparatus to which the above-water structure is attached, further comprising a catamaran wherein the nose pieces pierce the water surface and hull portions are attached to the trailing edges of the nose pieces and to the bottom plates wherein the majority of the hull portions are covered with gas, and also wherein the hull portions extend above the water surface where they are joined together with an above-water cross structure.

68. The apparatus of claim 67, wherein a propulsion system is included, and wherein the nose pieces are swept back and downward from the surface.

69. The apparatus of claim 68, wherein pressurized air is released to form air cavities which cover at least a portion of the undersides of the bottom plates, and wherein wetted fences separate the pressurized air lying below the bottom plates from the air lying above the bottom plates.

70. The apparatus of claim 69, further comprising flaps located under the bottom plates and near their forward edges wherein air is released rearward from the flaps along the surfaces of the bottom plates, and wherein the flaps are movable outward to increase the thickness of the underside air cavities.

71. The apparatus of claim 69, wherein air is removed from the underside of the bottom plates near the ends of the air cavities.

72. The method of operating water vehicles comprising releasing gas from an underwater surface rearward along the surface and reducing drag on the surface, further comprising releasing gas as lets from behind flaps attached to the surface, and extending the flaps over the gas jets for closing against the gas lets and for opening when gas is elected through the gas jets, and moving the flaps-outward with respect to the surface for increasing the thickness of the flaps in order to increase the thickness of a gas cavity behind the flaps.

73. The method of claim 72, further comprising withdrawing gas into the surface downstream of gas release.

74. The method of claim 73, further comprising means for recycling the withdrawn gas.

75. The method of claim 73, further comprising multiple locations along the surface for removing gas.

76. The method of claim 73, further comprising sensing conditions with sensors and adjusting gas flow through gas inlets according to conditions sensed by the sensors.

77. The method of claim 72, further comprising the release of gas as jets which are released at essentially the local water velocity and the local water flow direction.

78. The method of claim 72, further comprising releasing gas along the surface through gas jets in the surface.

79. The method of claim 72, wherein the surface is part of the submerged hull of a water craft.

80. The method of claim 72, wherein the surface is the upper and lower surfaces of a hydrofoil which is connected to at least one strut which pierces the water surface and supports an above-water structure.

81. The method of claim 80, wherein gas is released from at least one surface of the hydrofoil.

82. The method of claim 80, wherein the gas covers most of both surfaces of the hydrofoil.

83. The method of claim 72, wherein the surfaces lie behind a nose piece whose trailing edge projects outward ahead of the surfaces.

84. The method of claim 83, further comprising horizontally dividing the nose piece and moving an upper portion of the nose piece upward for increasing the local thickness of the cavity on the upper surface.

85. The method of claim 84, further comprising moving a lower portion of the nose piece downward for increasing the local thickness of the cavity on the lower surface.

86. The method of claim 72, wherein the surface includes each side of the underwater portion of a strut, and wherein gas is released over at least a portion of each side surface.

87. The method oft claim 72, wherein the surface is the underside of a bottom plate which is attached near the lower end of a surface-piercing strut-like nose piece.

88. The method of claim 72, further comprising/releasing gas along the surface through jets in the surface.

89. The method of claim 72, wherein wetted fences are used to separate cavities having different pressures.

90. The method of claim 72, wherein the gas is air.

91. The method of operating water vehicles comprising releasing gas from an underwater surface rearward along the surface and reducing drag on the surface, further comprising releasing gas as lets from behind flaps attached to the surface, and extending the flaps over the gas lets for closing against the gas jets and for opening when gas is elected through the gas jets, and moving the flaps outward with respect to the surface for increasing the thickness of the flaps in order to increase the thickness of the gas cavity behind the flaps, further comprising attaching air jets to the outer surface of the flaps to form air jet curtains which move outward with the flaps wherein the air jet velocity is close to the local water velocity.

92. The method of operating water vehicles comprising releasing gas from an underwater surface rearward along the surface and reducing drag on the surface, further comprising releasing gas as lets from behind flaps attached to the surface, and extending the flaps over the gas lets for closing against the gas lets and for opening when gas is elected through the gas lets, and moving the flaps outward with respect to the surface for increasing the thickness of the flaps in order to increase the thickness of the gas cavity behind the flaps, further comprising removing gas downstream of the gas release locations and sensing surface conditions along the surface and controlling flap deflections, gas release rates, and gas removal rates according to signals from the sensors.

93. The method of operating water vehicles comprising releasing gas from an underwater surface rearward along the surface and reducing drag on the surface, wherein the surface is the upper and lower surfaces of a hydrofoil which is connected to at least one strut which pierces, the water surface and supports an above-water structure, wherein the gas covers most of both surfaces of the hydrofoil, wherein a lower-pressure gas source releases gas along the upper surface of the hydrofoil and a higher-pressure gas source released gas along the lower surface of the hydrofoil.

94. The method of claim 93, further comprising one or more struts, the surface further comprises upper and lower surfaces of the hydrofoil, and wherein most of each surface of the hydrofoil and most of each side surface of the struts are covered with gas.

95. The method of operating water vehicles comprising releasing gas from an underwater surface rearward along the surface and reducing drag on the surface, further comprising releasing gas as jets from behind flaps attached to the surface, further comprising extending the flaps over the gas jets for closing against the gas jets and for opening when gas is ejected through the gas jets.

96. The method of increasing lift on one side of a hydrofoil by moving one side of a nose section of the hydrofoil outward, and exhausting sufficient gas behind the nose section to form a near-constant-pressure gas cavity that closes just ahead of a trailing edge, thereby significantly increasing the thickness of the overall hydrofoil-and-cavity shape on that side to increase dynamic lift.

97. The method of claim 96, including the method of angling the trailing edge toward the opposite side to further increase dynamic lift.

98. The method of claim 96, including removal of gas ahead of the trailing edge.

99. The method of claim 96, including sweeping back the hydrofoil greater than 45°.

* * * * *